(12) United States Patent
Ocalan

(10) Patent No.: US 8,866,317 B2
(45) Date of Patent: Oct. 21, 2014

(54) BROADBAND VIBRATIONAL ENERGY HARVESTING

(71) Applicant: Schlumberger Technology Corporation, Sugar Land, TX (US)

(72) Inventor: Murat Ocalan, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 24 days.

(21) Appl. No.: 13/742,164

(22) Filed: Jan. 15, 2013

(65) Prior Publication Data

US 2013/0181689 A1 Jul. 18, 2013

Related U.S. Application Data

(60) Provisional application No. 61/587,221, filed on Jan. 17, 2012.

(51) Int. Cl.
*F02B 63/04* (2006.01)

(52) U.S. Cl.
USPC .............................................. 290/1 R; 310/12

(58) Field of Classification Search
USPC ................................ 290/1 R, 1 A, 43; 310/12
See application file for complete search history.

(56) References Cited

U.S. PATENT DOCUMENTS

| | | | |
|---|---|---|---|
| 7,199,480 B2 | 4/2007 | Fripp et al. | |
| 7,208,845 B2 | 4/2007 | Masters et al. | |
| 7,400,262 B2 | 7/2008 | Chemali et al. | |
| 7,453,163 B2 * | 11/2008 | Roberts et al. | 290/1 R |
| 7,498,681 B1 * | 3/2009 | Kellogg et al. | 290/1 R |
| 7,514,804 B2 | 4/2009 | Wang | |
| 7,692,366 B2 | 4/2010 | Thiesen | |
| 7,906,861 B2 * | 3/2011 | Guerrero et al. | 290/1 R |
| 7,999,402 B2 | 8/2011 | Freeland et al. | |
| 8,350,394 B2 | 1/2013 | Cottone et al. | |
| 8,471,439 B2 | 6/2013 | Moon et al. | |
| 8,508,193 B2 | 8/2013 | Keating et al. | |
| 8,604,634 B2 * | 12/2013 | Pabon et al. | 290/54 |
| 8,629,569 B2 * | 1/2014 | Roberts et al. | 290/1 R |
| 8,680,694 B2 * | 3/2014 | Parker et al. | 290/1 R |

(Continued)

OTHER PUBLICATIONS

Trimble, "Energy Harvesting of Random Wide-band Vibrations with Applications to an Electro-Magnetic Rotational Energy Harvester," PhD Thesis, Massachusetts Institute of Technology, Dept. of Mech. Eng., 2011: 207 pages (3 Parts).

(Continued)

*Primary Examiner* — Nicholas Ponomarenko
(74) *Attorney, Agent, or Firm* — Bridget Laffey; Jakub M. Michna

(57) ABSTRACT

A system that converts environmental vibrational energy into electrical energy includes a transducer that undergoes oscillating movement in response to the vibrational energy in order to produce an oscillating electrical signal. Power electronics process the oscillating electrical signal. A control system (including at least one control element of the power electronics, at least one sensor and control electronics) carries out a control scheme that dynamically varies the dampening of the oscillating movement of the transducer over time. The control scheme is based upon a predetermined parametric relation involving a plurality of variables derived from the properties measured by the at least one sensor. In several embodiments, the plurality of variables includes a first variable representing excitation frequency of the transducer. In another embodiment, the predetermined parametric relation represents relative phase between two variables derived from the properties measured by the at least one sensor.

34 Claims, 15 Drawing Sheets

(56) References Cited

U.S. PATENT DOCUMENTS

| | | | |
|---|---|---|---|
| 2009/0127976 A1* | 5/2009 | Ward et al. | 310/319 |
| 2010/0194117 A1 | 8/2010 | Pabon et al. | |
| 2010/0308599 A1* | 12/2010 | Pabon et al. | 290/1 A |
| 2011/0004444 A1* | 1/2011 | Farrow et al. | 702/187 |
| 2014/0021825 A1* | 1/2014 | Ocalan et al. | 310/300 |

OTHER PUBLICATIONS

Wagg et al., "A review of non-linear structural control techniques," Proc. IMechE, J. Mechanical Engineering Science, 2010, vol. 225 (Part C): pp. 759-770.

Williams et al., "Analysis of a micro-electric generator for microsystems," Sensors and Actuators A, 1996, vol. 52: pp. 8-11.

Wu et al., "Modeling and experimental verification of synchronized discharging techniques for boosting power harvesting from piezoelectric transducers," Smart Mater. Struct., 2009, vol. 18: pp. 1-14.

Zhu et al., "Strategies for increasing the operating frequency range of vibration energy harvesters: a review," Meas. Sci. Technol., 2010, vol. 21: pp. 1-29.

International Search Report and Written Opinion of PCT Application No. PCT/US2013/021642 dated Apr. 24, 2013: pp. 1-12.

Adhikari et al., "Piezoelectric energy harvesting from broadband random vibrations," Smart Mater. Struct., 2009, vol. 18: pp. 1-7.

Ammar et al., "Non-linear Techniques for Increasing Harvesting Energy from Piezoelectric and Electromagnetic Micro-Power-Generators," DTIP of MEMS & MOEMS, Apr. 2006: pp. 1-5.

Anton et al., "A review of power harvesting using piezoelectric materials (2003-2006)," Smart Mater. Struct., 2007, vol. 16: pp. R1-R21.

Arnold, "Review of Microscale Magnetic Power Generation," IEEE Transactions on Magnetics, Nov. 2007, vol. 43(11): pp. 3940-3951.

Arrieta et al., "A piezoelectric bistable plate for nonlinear broadband energy harvesting," Applied Physics Letters, 2010, vol. 97: pp. 104102-1 to 104102-3.

Arroyo et al., "Comparison of electromagnetic and piezoelectric vibration energy harvesters: Model and experiments," Sensors and Actuators A: Physical, 2012, vol. 183: pp. 148-156.

Beeby et al.,"Energy harvesting vibration sources for microsystems applications," Meas. Sci. Technol., 2006, vol. 17: pp. R175-R195.

Cammarano et al., "Tuning a resonant energy harvester using a generalized electrical load," Smart Mater. Struct., 2010, vol. 19: pp. 1-7.

Cassidy et al., "Optimization of partial-state feedback for vibratory energy harvesters subjected to broadband stochastic disturbances," Smart Mater. Struct., 2011, vol. 20: pp. 1-13.

Challa et al., "A vibration energy harvesting device with bidirectional resonance frequency tunability," Smart Mater. Struct., 2008, vol. 17: pp. 1-10.

Challa et al., "Towards an autonomous self-tuning vibration energy harvesting device for wireless sensor network applications," Smart Mater. Struct., 2011, vol. 20: pp. 1-11.

Clark, "Vibration Control with State-Switched Piezoelectric Materials," Journal of Intelligent Material Systems and Structures, Apr. 2000, vol. 11: pp. 263-271.

Cottone et al., "Nonlinear Energy Harvesting," Physical Review Letters, Feb. 2009, vol. PRL 102: pp. 080601-1-080601-4.

Crandall, "Chapter 6: Electromechanical transducers," Dynamics of Mechanical and Electromechanical Systems, R.E. Krieger Publishing Company, Inc.: Malabar, 1982: 291-301.

Davis et al., "An Actively Tuned Solid-State Vibration Absorber Using Capacitive Shunting of Piezoelectric Stiffness," Journal of Sound and Vibration, 2000, vol. 232(3): pp. 2387-2396.

Dayal et al. "Design and Implementation of a Direct AC-DC Boost Converter for Low-Voltage Energy Harvesting,"IEEE Transactions on Industrial Electronics, Jun. 2011, vol. 58(6): pp. 2387-2396.

Dutoit et al., "Design Considerations for MEMS-Scale Piezoelectric Mechanical Vibration Energy Harvesters," Integrated Ferroelectrics, 2005, vol. 71: pp. 121-160.

Erturk et al., "Issues in mathematical modeling of piezoelectric energy harvesters," Smart Mater. Struct., 2008, vol. 17: pp. 1-14.

Erturk et al., "An experimentally validated bimorph cantilever model for piezoelectric energy harvesting from base excitations," Smart Mater. Stuct., 2009, vol. 18(2): pp. 1-18.

Ferrari et al., "Improved energy harvesting from wideband vibrations by nonlinear piezoelectric converters," Sensors and Actuators A:Physical, 2010, vol. 162: pp. 425-431.

Guyomar et al., "Toward Energy Harvesting Using Active Materials and Conversion Improvement by Nonlinear Processing," IEEE Transactions on Ultrasonics, Ferroelectrics, and Frequency Control, Apr. 2005, vol. 52(4): pp. 584-595.

Hagood et al., "Damping of Structural Vibrations with Piezoelectric Materials and Passive Electrical Networks," Journal of Sound and Vibration, 1991, vol. 146(2): pp. 243-268.

Hajati et al., "Ultra-wide bandwidth piezoelectric energy harvesting," Applied Physics Letters, 2011, vol. 99: pp. 083105-1-083105-3.

Jalili, "A Comparative Study and Analysis of Semi-Active Vibration-Control Systems," Journal of Vibration and Acoustics, Oct. 2002, vol. 124: pp. 593-605.

Jalili et al., "Structural vibration control using an active resonator absorber: modeling and control implementation," Smart Mater. Struct., 2004, vol. 13: pp. 998-1005.

Jalili et al., "Chapter 5: Vibration Control," Damping, Control, and Design, CRC Press: Boca Raton, ed.: de Silva, 2007: pp. 1-46.

Karnopp et al., "Vibration Control Using Semi-Active Force Generators," Journal of Engineering for Industry, May 1974: pp. 619-626.

Kong et al., "Resistive Impedance Matching Circuit for Piezoelectric Energy Harvesting," Journal of Intelligent Material Systems and Structures, 2010, vol. 21: pp. 1293-1302.

Lallart et al., "High efficiency, wide load bandwidth piezoelectric energy scavenging by a hybrid nonlinear approach," Sensors and Actuators A: Physical, 2011, vol. 165: pp. 294-302.

Lefeuvre et al., "A comparison between several vibration-powered piezoelectric generators for standalone systems," Sensors and Actuators A, 2006, vol. 126: pp. 405-416.

Lien et al, "Revisit of series-SSHI with comparisons to other interfacing circuits in piezoelectric energy harvesting," Smart Mater. Struct., 2010, vol. 19: pp. 1-12.

Lin et al., "The magnetic coupling of a piezoelectric cantilever for enhanced energy harvesting efficiency," Smart Mater. Struct., 2010, vol. 19: pp. 1-7.

Liu et al., "A comparison of semi-active damping control strategies for vibration isolation of harmonic disturbances," Journal of Sound and Vibration, 2005, vol. 280: pp. 21-39.

Liu et al., "Velocity-Controlled Piezoelectric Switching Energy Harvesting Device," International Conference on Renewable Energies and Power Quality (ICREPQ'09), Apr. 2009: pp. 1-5.

Makihara et al., "Low energy dissipation electric circuit for energy harvesting," Smart Mater. Struct., 2006, vol. 15: pp. 1493-1498.

Marinkovic et al., "Smart Sand—a wide bandwidth vibration energy harvesting platform," Applied Physics Letters, 2009, vol. 94: pp. 103505-1-103505-3.

Melcher, "Equation 2.15.14," Continuum Electromechanics, The MIT Press: Cambridge, 1981: p. 2.31.

Mitcheson et al., "Power processing circuits for electromagnetic, electrostatic and piezoelectric inertial energy scavengers," Microsyst Technol, 2007, vol. 13: pp. 1629-1635.

Mitcheson et al., "Energy Harvesting from Human and Machine Motion for Wireless Electronic Devices," Proceedings of the IEEE, Sep. 2008, vol. 96(9): pp. 1457-1486.

Mitcheson et al., "Chapter 6: Power Management Electronics," Energy Harvesting for Autonomous Systems, Artech House: Norwood, eds. Beeby et al., 2010: pp. 159-209.

Neubauer et al.,"Parametric studies on the harvested energy of piezoelectric switching techniques," Smart Mater. Struct., 2010, vol. 19: pp. 1-10.

Ottman et al., "Optimized Piezoelectric Energy Harvesting Circuit Using Step-Down Converter in Discontinuous Conduction Mode," IEEE Transactions on Power Electronics, Mar. 2003, vol. 18(2): pp. 696-703.

Ramaratnam et al., "Semi-active Vibration Control Using Piezoelectric-Based Switched Stiffness," Proceedings of the American Control Conference, Jun. 2004: pp. 5461-5466.

(56) References Cited

OTHER PUBLICATIONS

Renno et al., "On the optimal energy harvesting from a vibration source," Journal of Sound and Vibration, 2009, vol. 320: pp. 386-405.
Roundy et al., "Improving Power Output for Vibration-Based Energy Scavengers," IEEE Pervasive Computing, Jan.-Mar. 2005, vol. 4(1): pp. 28-36.
Shu et al., "An improved analysis of the SSHI interface in piezoelectric energy harvesting," Smart Mater. Struct. 2007, vol. 16: pp. 2253-2264.
Sodano et al., "A Review of Power Harvesting from Vibration using Piezoelectric Materials," The Shock and Vibration Digest, May 2004, vol. 36(3): pp. 197-205.
Stephen, "On energy harvesting from ambient vibration," Journal of Sound and Vibration, 2006, vol. 293: pp. 409-425.
Tang et al., "Toward Broadband Vibration-Based Energy Harvesting," Journal of Intelligent Material Systems and Structures, Dec. 2010, vol. 21: pp. 1867-1897.
Trimble et al., "A Device for Harvesting Energy from Rotational Vibrations," Journal of Mechanical Design, Sep. 2010, vol. 132: pp. 091001-1 to 091001-6.

* cited by examiner

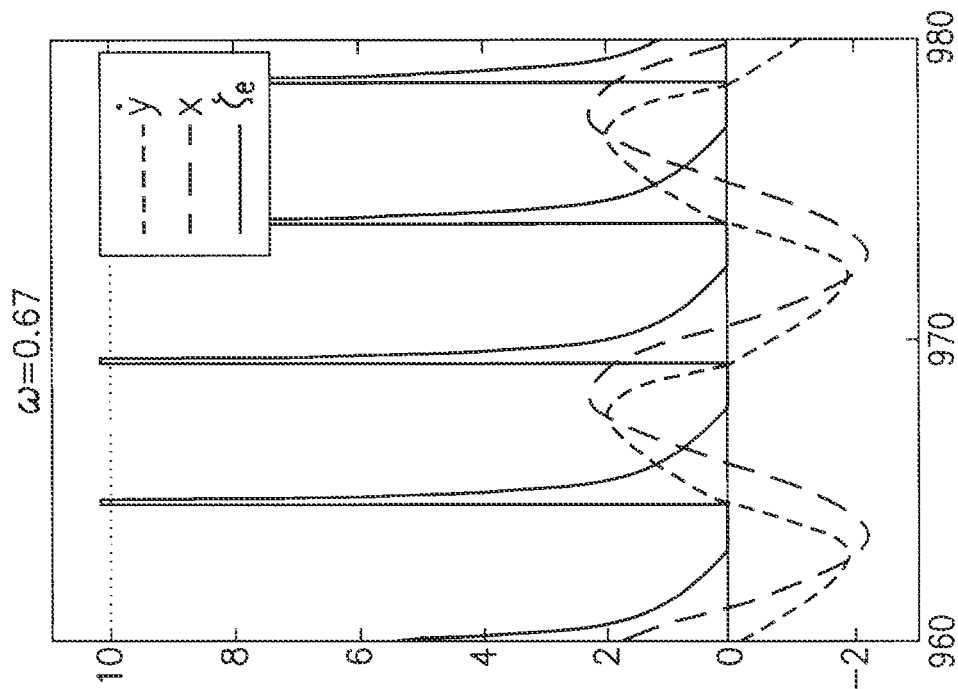
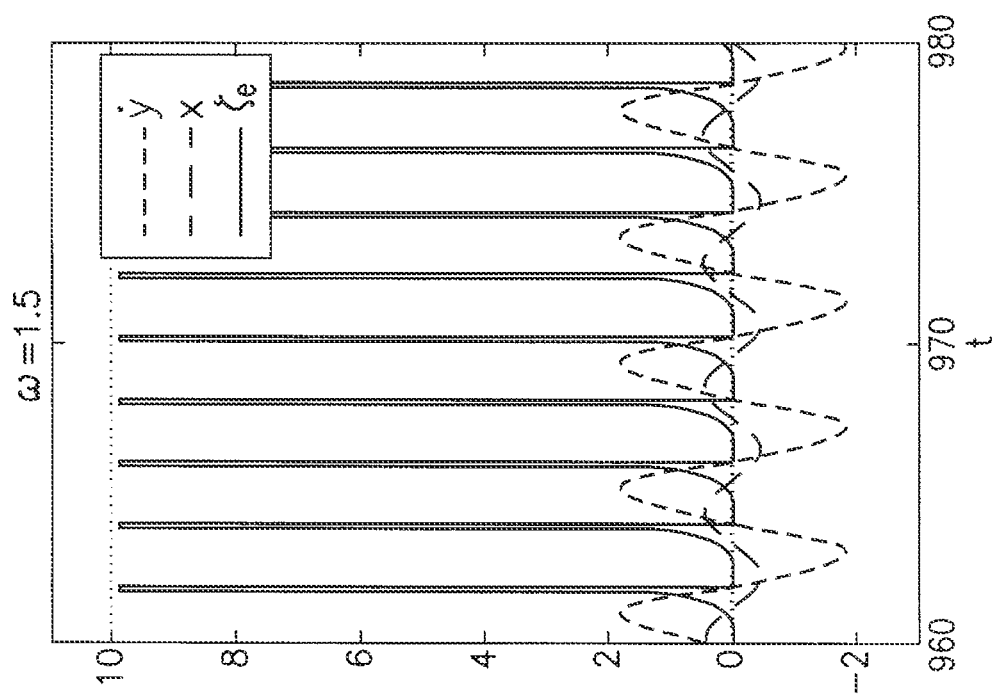

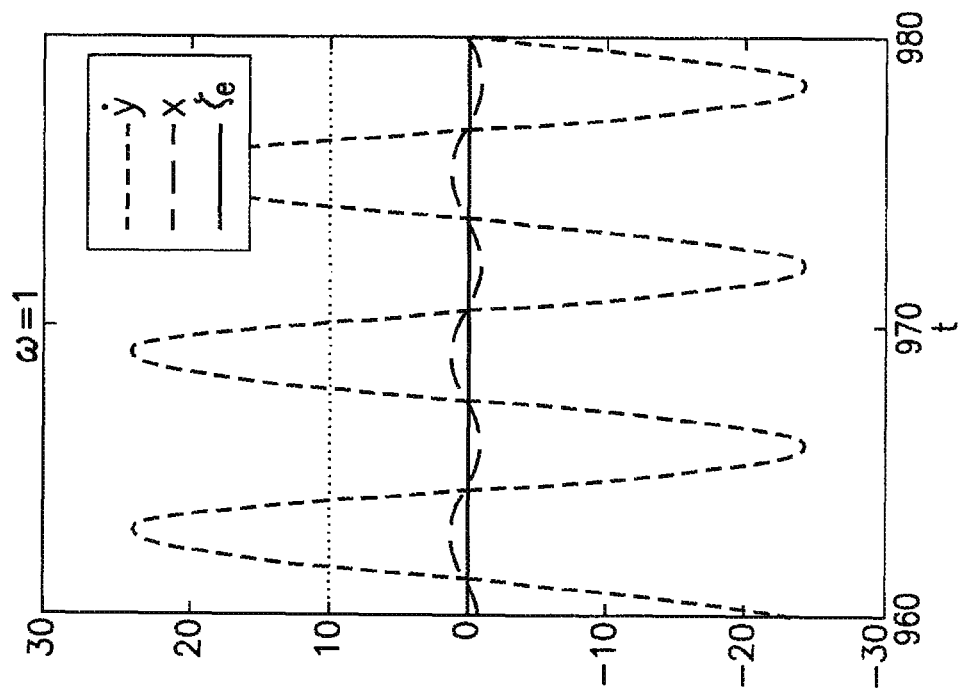
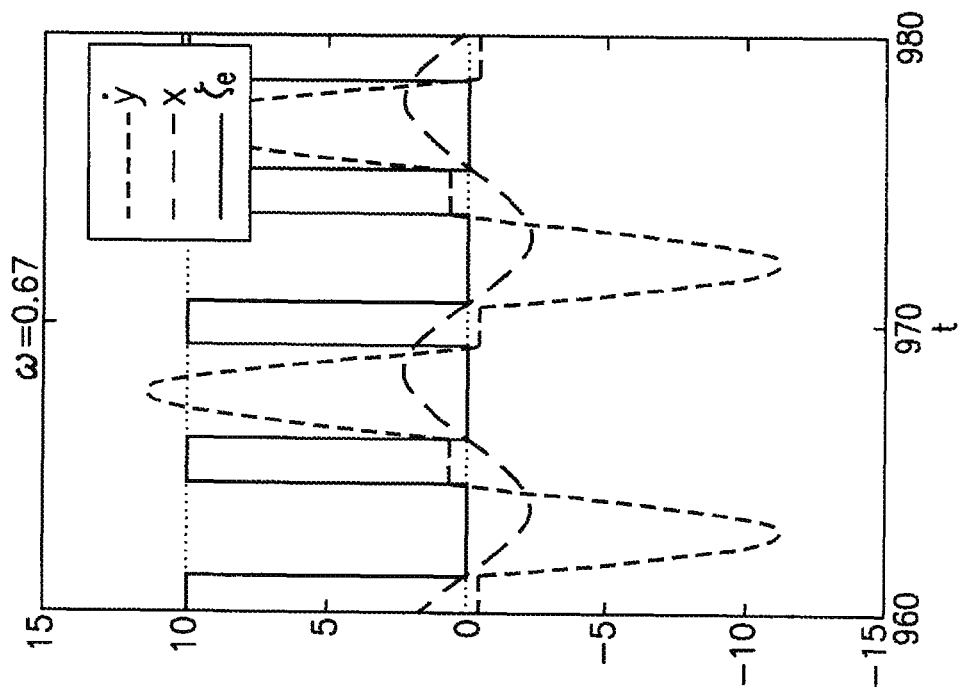
FIG. 7(A)
FIG. 7(B)

BROADBAND VIBRATIONAL ENERGY HARVESTING

CROSS-REFERENCE TO RELATED APPLICATION

The present application claims the benefit of U.S. Provisional Patent Application Ser. No. 61/587,221 filed on Jan. 17, 2012, which is incorporated herein by reference in its entirety.

FIELD

The present application relates to electromechanical systems for harvesting useful electrical energy from environmental vibrational energy. More specifically, the present application relates to electromagnetic and piezoelectric generators that convert environmental vibrational energy to electrical energy.

BACKGROUND

Harvesting energy from the environmental vibration sources has received a renewed attention in recent years in part due to their applications in wireless networks and portable electronics.

A number of studies in the literature have investigated utilizing discrete electrical components (DuToit et al., 2005; Adhikari et al., 2009; Renno et al., 2009; Cammarano et al., 2010; Trimble, 2011) or linear control systems (Kong et al., 2010; Cassidy et al., 2011; Trimble, 2011).

In another class of studies, switching electronics are utilized to increase harvested power (Guyomar et al., 2005; Lefeuvre et al., 2006; Makihara et al., 2006). These methods were applied to piezoelectric harvesters to generate a favorable electrical load on the active element and increase the voltage output of the harvester which were also shown to increase the power output.

Switching electrical loads to improve transducer performance has been investigated in various vibration control applications (Jalili, 2002; Liu et al., 2005; Wagg and Neild, 2011). Control of shunt resistance (Clark, 2000) and capacitance (Davis and Lesieutre, 2000) electrically connected across a piezoelectric transducer was shown to improve vibration damping performance of these systems.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments are provided for a system that converts environmental vibrational energy into electrical energy for storage in at least one electrical power storage device. The system includes a transducer that undergoes oscillating movement in response to the environmental vibrational energy. The transducer produces an oscillating electrical signal in response to such oscillating movement. Power electronics is operably coupled between the transducer and the at least one electrical power storage device. The power electronics process the oscillating electrical signal produced by the transducer. The power electronics include at least one control element having a configuration that provides variable dampening of the oscillating movement of the transducer in response to at least one control signal supplied thereto. The system further includes at least one sensor for measuring properties of the oscillating movement of the transducer over time. Control electronics is operably coupled to the at least one control element of the power electronics and to the at least one sensor. The control electronics carry out a control scheme that generates and supplies the at least one control signal to the at least one control element over time in a manner that controls the at least one control element to dynamically vary the dampening of the oscillating movement of the transducer over time. The control scheme is based upon a predetermined parametric relation involving a plurality of variables derived from the properties measured by the at least one sensor. In several embodiments, the plurality of variables includes a first variable representing excitation frequency of the transducer. The plurality of variables can also include a second variable representing relative position of the transducer, a third variable representing relative velocity of the transducer, and a fourth variable representing relative acceleration of the transducer.

In one embodiment, the parametric relation includes a term representing a damping factor for controlling the damping of the oscillating movement of the transducer, where the term is equivalent to the sum of a mechanical damper with a constant damping coefficient and a spring with a predetermined spring constant. The predetermined spring constant can be configured such that the system resonance matches a particular off-resonant excitation frequency. The term can be constrained by a lower bound that is greater than or equal to zero such that the damping factor term is positive. Alternatively, the term can be constrained by a lower bound that is less than zero such that the damping factor term can be both negative and positive.

In another embodiment, the parametric relation includes a term representing a damping factor for controlling the damping of the oscillating movement of the transducer, wherein the term is equivalent to a mechanical damper with a constant damping coefficient and a simulated mass. The simulated mass can be configured such that the system resonance matches a particular off-resonant excitation frequency. The term can be constrained by a lower bound that is greater than or equal to zero such that the damping factor term is positive. Alternatively, the term can be constrained by a lower bound that is less than zero such that the damping factor term can be both negative and positive.

In yet another embodiment, the control scheme carried out by the control electronics can be based upon a predetermined parametric relation representing relative phase between two variables derived from the properties measured by the at least one sensor. The two variables can have a phase relationship of 180 degrees out of phase in resonant vibrations, and the control scheme can be configured to bring the two variables into a target phase relationship of 180 degrees out of phase for cases when the phase relationship of the two variables varies from the target phase relationship. The control scheme need not require measurement of the excitation frequency of the transducer over time.

In the various embodiments, the parametric relation of the control scheme can be configured to extend the bandwidth of oscillatory movements of the transducer that produce oscillating electrical signals by the transducer in order to improve the off-frequency energy harvesting performance of the system.

The transducer can include at least one coil and magnet that move relative to one another, wherein the at least one coil produces the oscillating electrical signal. The at least one control element of the power electronics can be realized by a variable load circuit operably coupled to the output of the at least one coil.

Alternatively, the transducer can include at least one piezoelectric element that produces the oscillating electrical signal. The at least one control element of the power electronics can be realized by a variable load circuit operably coupled to the output of the at least one piezoelectric element.

BRIEF DESCRIPTION OF THE DRAWINGS

FIGS. 5(A), 5(B) and 5(C) are graphs of the simulation results showing the transducer excitation, transducer response (relative velocity), and the time varying electrical damping factor of the system of FIG. 1 in the time domain, where the system employs a control scheme referred to herein as a simulated spring control scheme; FIG. 5(A) is a graph of the simulation results of the system for a subcritical excitation. FIG. 5(B) is a graph of the simulation results of the system for resonant excitation. FIG. 5(C) is a graph of the simulation results of the system for a supercritical excitation;

FIGS. 6(A), 6(B) and 6(C) are graphs of the simulation results showing the transducer excitation, transducer response (relative velocity), and the time varying electrical damping factor of the system of FIG. 1 in the time domain, where the system employs a control scheme referred to herein as a simulated mass control scheme; FIG. 6(A) is a graph of the simulation results of the system for a subcritical excitation. FIG. 6(B) is a graph of the simulation results of the system for resonant excitation. FIG. 6(C) is a graph of the simulation results of the system for a supercritical excitation;

FIGS. 7(A), 7(B) and 7(C) are graphs of the simulation results showing the transducer excitation, transducer response (relative velocity), and the time varying electrical damping factor of the system of FIG. 1 in the time domain, where the system employs a control scheme referred to herein as a phase-matching control scheme; FIG. 7(A) is a graph of the simulation results of the system for a subcritical excitation. FIG. 7(B) is a graph of the simulation results of the system for resonant excitation. FIG. 7(C) is a graph of the simulation results of the system for a supercritical excitation;

DETAILED DESCRIPTION

Figure 1:
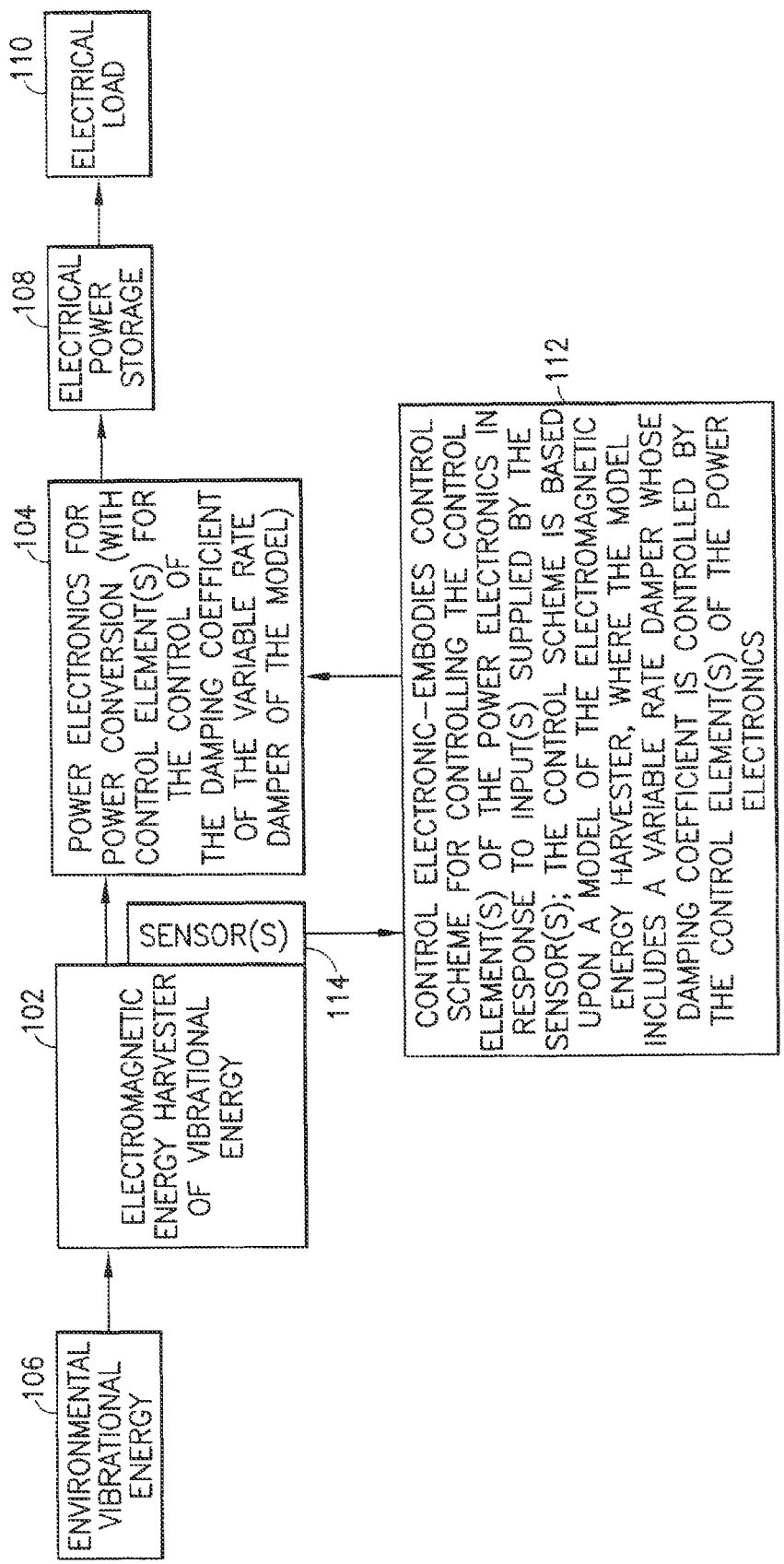
FIG. 1 is a functional block diagram of an exemplary system that converts environmental vibrational energy into electrical energy for storage in at least one electrical power storage device in accordance with embodiments described herein.

FIG. 1 is a schematic diagram of a system in accordance with the present application. The system includes an electromagnetic energy harvester 102 that cooperates with power electronics 104 to convert environmental vibrational energy 106 into electrical energy that is stored in one or more electrical power storage devices 108. For example, the electrical power storage device(s) 108 can be realized by one or more capacitors (or batteries) that store electrical energy and output the stored electrical energy as DC voltage (current). The electrical energy stored by the electrical power storage device(s) 108 can be supplied to one or more electrical loads 110 for powering the electrical loads. Such supply can involve conversion of the electrical energy output from the electrical power storage device(s) 108 into a form suitable for consumption by the electrical loads 110. For example, DC voltage (current) output by the electrical power storage device(s) 108 can be converted into other DC voltage (current) signals (i.e., up-converted or down-converted) and/or possibly converted to AC voltage (current) power signals (such as standard 110V AC or 220V AC power signals).

Figure 2:
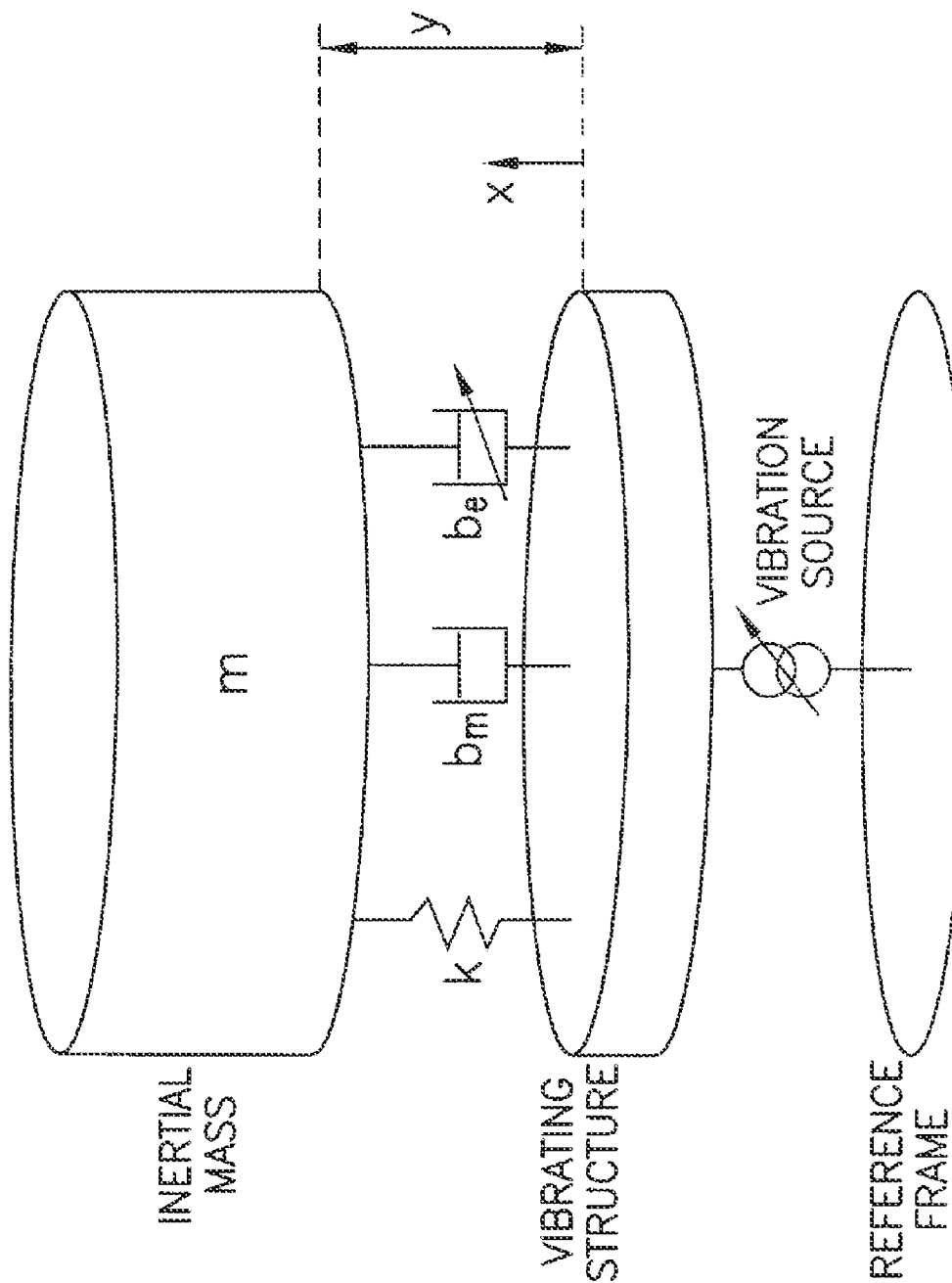
FIG. 2 is a schematic representation of a mechanical model of the electromagnetic vibrational energy harvester of FIG. 1.

The electromagnetic energy harvester 102 includes a transducer of inertial mass m attached by a structural spring of a static spring constant k to a vibrating structure secured to a reference frame as shown in the schematic diagram of FIG. 2. For example, the transducer can be realized by one or more coils attached to the inertial mass, and one or more magnets attached to the vibrating structure. Alternatively, the transducer can be realized by one or more magnets attached to the inertial mass, and one or more coils attached to the vibrating structure. Environmental vibration from a vibration source causes the transducer to oscillate and thus causes the coil(s) to cut through and interact with flux formed by the magnet to generate current oscillations in the coil(s). The present application treats this electromagnetic transducer as a variable rate mechanical damper. In order to understand this approximation, one must understand the details of the electromagnetic transduction carried out by the electromagnetic transducer.

More specifically, the electromotive force, V, generated by the electromagnetic transducer is proportional to the speed, $\dot{x}$, of the transducer for a large range of transducers (including the prototypical moving coil transducer) as follows:

$$V = T\dot{x}, \quad (1)$$

where T is the constant of proportionality of the electromagnetic transducer.

The constant of proportionality T also linearly relates the coil current i to the transducer force $F_E$ as follows:

$$F_E = -Ti \quad (2)$$

The relationship between the electromotive force, V, and the coil current i is determined by the power electronics 104 that are used in conjunction with the harvester 102.

Figure 3:
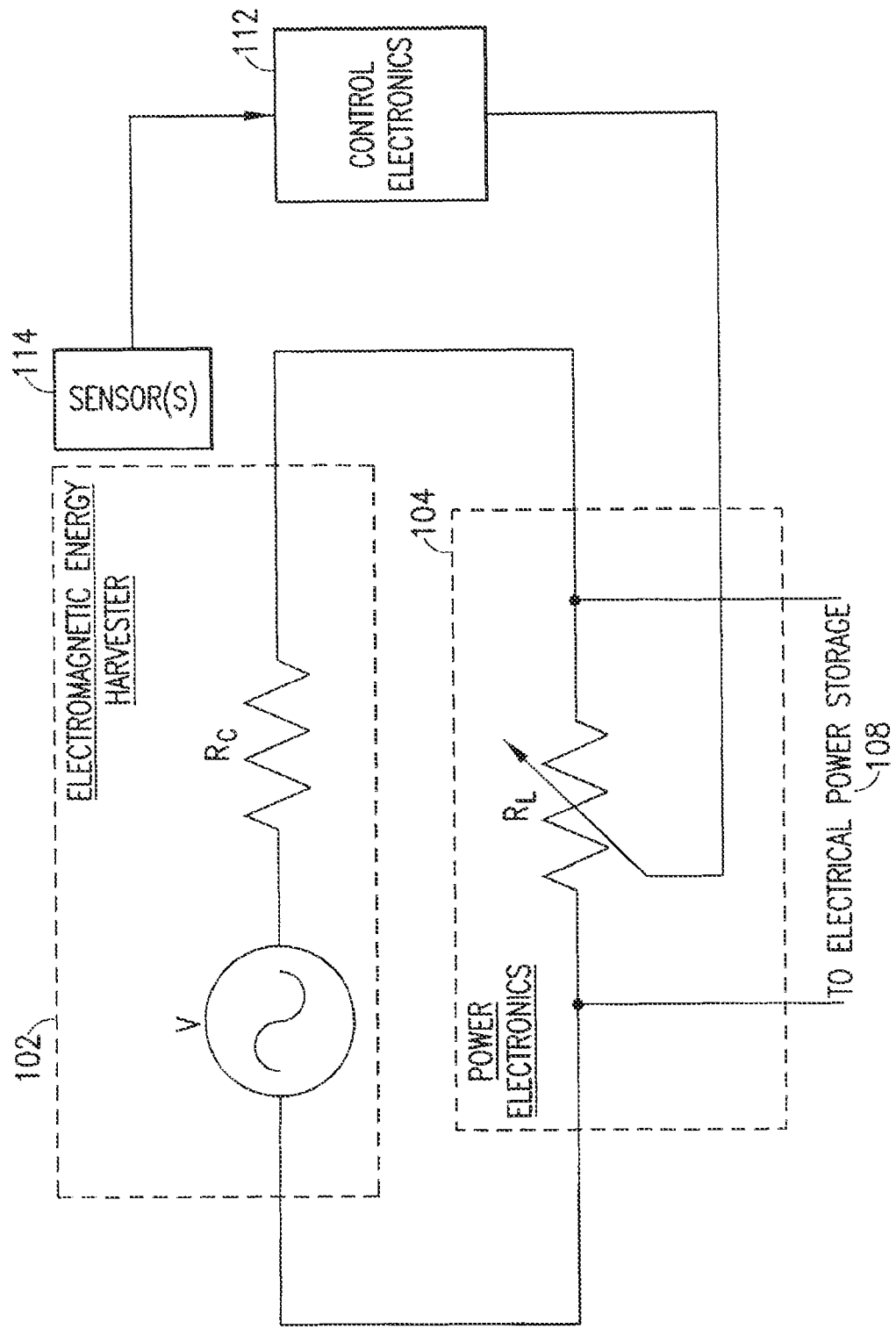
FIG. 3 is a schematic representation of an electrical model of the electromagnetic vibrational energy harvester of FIG. 1.

In the illustrative embodiment, the electrical model of the harvester 102 and the power electronics 104 includes a resistance $R_C$, of the coil(s) of the electromagnetic transducer of the harvester 102 and a variable load of the power electronics 104, which is illustrated by the variable resistance $R_L$ as shown in FIG. 3. The variable load resistance $R_L$ is a simplified model of rectification, load matching or other more complicated circuitry that is normally utilized for the power electronics 104. Non-limiting examples of variable load circuits included in the power electronics are DC-DC buck converter, buck-boost converter (Kong et al., 2010) and H-bridge switching network (Cassidy et al., 2011). The inductance L of the coil of the electromagnetic transducer, which provides a negligible effect in the low frequency range of the system (where the frequency ω is given as $(R_C+R_L)/L$), is also neglected. Using this model, the coil current i can be represented as:

$$i = \frac{V}{R_C + R_L} \quad (3)$$

Using Equations (1)-(3), the transducer force can be expressed as:

$$F_E = -\frac{T^2}{R_C + R_L}\dot{x} = -b_e\dot{x} \quad (4)$$

where $b_e$ is the electrical damping coefficient.

With this equation, one can see that the coil(s) of the electromagnetic transducer behaves analogous to a mechanical damper with a variable damping rate. The electrical damping coefficient $b_e$ can be equated to $$\frac{T^2}{(R_C + R_L)},$$

and can be controlled by varying the load resistance $R_L$. In this manner, the variable load resistance $R_L$ of the power electronics 104 acts as a control element that can be varied to control the damping rate of the electromagnetic transducer. The term electrical damping is utilized in this application to refer to electromechanical transduction. Therefore the mechanical energy is converted into the electrical domain in the process and not dissipated.

For a pure AC, zero-inductance power source, the transfer of power to the load is maximized if the load resistance is matched to the coil resistance. Variability in the input impedance of the electrical loads 110 that will be powered by the harvester 102 and associated power storage devices 108 uses control electronics 112 that achieve such load matching. Applicability of such a simple load matching control strategy is limited since this approach results in optimal power harvesting in devices which output a pure, constant-frequency sinusoid. Another implicit assumption is that the harvester force has no effect on the mechanical system. Considering that vibrational harvesters operate near their resonance, where the stiffness forces are balanced with inertial forces, a small amount of change in damping can result in a pronounced difference in performance. It is thus important to analyze the mechanical system of the energy harvester 102 to determine the optimal control strategy carried out by the control electronics 112.

In the illustrative embodiment, the energy harvester 102 and associated power electronics 104 are modeled by a mass-spring resonator as shown in FIG. 2. The mass-spring resonator has two dampers:

a fixed damper with a damping coefficient $b_m$ to model the intrinsic mechanical damping of the system; and a variable damper with a damping coefficient $b_e$ to model the electromagnetic transducer.

The control electronics 112 of the energy harvester 102 can be configured to carry out a control scheme that selects an appropriate value of the damping coefficient $b_e$ to enhance the system bandwidth. The control scheme can be a simulated spring control scheme, a simulated mass control scheme or a phase-matching control scheme as summarized below.

In the simulated spring control scheme, the damping coefficient $b_e$ is varied such that the electromagnetic transducer behaves similar to a spring and a fixed-rate damper whenever possible. This is particularly useful if the background vibration is near-sinusoidal with a background excitation frequency not matching the resonant frequency. The spring term for this control scheme is adjusted to match what is required to match these two frequencies. This results in a damping coefficient $b_e$ of the from:

$$b_e = b_{opt} + (\omega^2 m - k)\frac{y}{\dot{y}} \quad (5)$$

where ω is the background excitation frequency, $b_{opt}$ is the fixed rate optimal damper simulated by the electromagnetic transducer, and $$(\omega^2 m - k)\frac{y}{\dot{y}}$$

is the spring term that is adjusted by the control scheme.

The simulated spring term [i.e., $$(\omega^2 m - k)\frac{y}{\dot{y}}]$$

of Eqn. 5 is based on the displacement y, the relative speed $\dot{y}$, the mass m, the spring constant k, and the base excitation frequency ω. The displacement y and the relative speed $\dot{y}$ can be derived from the output of the sensor(s) 114. The base excitation frequency ω can be derived from analog or digital processing of a sensor signal. The parameter m is dictated by the inertial mass of the transducer, and the parameter k is dictated by the spring constant of the transducer. The damping coefficient $b_e$ can be limited by predetermined bounds for both semi-active (uni-polar) schemes where the electrical damping is limited to positive values ($b_e>0$) as well as bi-polar schemes.

In the simulated mass control scheme, the damping coefficient $b_e$ is varied such that the electromagnetic transducer behaves with a simulated mass that is adjusted such that resonance frequency of the system matches the background excitation frequency. The damping coefficient $b_e$ in this case is:

$$b_e = b_{opt} + k\left(\frac{1}{\omega^2} - \frac{1}{\omega_0^2}\right)\frac{\ddot{y}}{\dot{y}} \quad (6)$$

where $b_{opt}$ is the fixed rate optimal damper simulated by the electromagnetic transducer, and $$k\left(\frac{1}{\omega^2} - \frac{1}{\omega_0^2}\right)\frac{\ddot{y}}{\dot{y}}$$

is the mass term that is adjusted by the control scheme. The simulated mass term [i.e., $$k\left(\frac{1}{\omega^2} - \frac{1}{\omega_0^2}\right)\frac{\ddot{y}}{\dot{y}}\Big]$$

of Eqn. 6 is based on the relative speed $\dot{y}$, the relative acceleration $\ddot{y}$, spring constant k, the base excitation frequency $\omega$, and the resonance frequency $\omega_0$. The relative speed $\dot{y}$ and the relative acceleration $\ddot{y}$ can be derived from the output of the sensor(s) 114. The parameter k is dictated by the spring constant of the transducer. The parameter $\omega_0$ is the natural frequency of the transducer given by $\omega_0 = \sqrt{k/m}$ where m is the inertial mass of the transducer. The base excitation frequency $\omega$ can be derived from analog or digital processing of a sensor signal. The damping coefficient $b_e$ can be limited by predetermined bounds for both semi-active (uni-polar) schemes where the electrical damping is limited to positive values ($b_e > 0$) as well as bi-polar schemes.

In resonant vibration of the system, there are fixed phase relationships that exist between system variables. For example the excitation acceleration $\ddot{x}$ is 180 degrees out-of-phase with the relative velocity $\dot{y}$. For non-resonant excitations however, these phase relationships vary from the resonant case. In the phase-matching control scheme these relationships are used to adjust the damping coefficient $b_e$ to move a non-resonance vibration excitation towards resonance. One such control law is of the form:

$$b_e = \begin{cases} b_e^{min} & \ddot{x}\dot{y} \leq 0 \\ b_e^{max} & \ddot{x}\dot{y} > 0 \end{cases} \quad (7)$$

where $b_e^{min}$ and $b_e^{max}$ are the lower and upper bounds on the damping coefficient $b_e$.

The relative speed $\dot{y}$ and the excitation acceleration $\ddot{x}$ can be derived from the output of the sensor(s) 114. The bounds $b_e^{min}$ and $b_e^{max}$ of Eqn. (7) can be dictated by the capabilities of the electromagnetic harvester or imposed by the designer to improve system performance for both semi-active (uni-polar) schemes where the electrical damping is limited to positive values ($b_e > 0$) as well as bi-polar schemes.

In dimensionless form, the equation of motion of the transducer of FIG. 2 is given as:

$$\ddot{y} + 2(\zeta_e + \zeta_m)\dot{y} + y = -\ddot{x}, \quad (8)$$

with a base excitation of $\ddot{x} = \sin(\omega t)$.

For brevity all variables in the remainder of this application will be switched with their dimensionless form. Their dimensional forms will be denoted with tilde (●). The damping factor $\zeta_e = b_e/2\omega_0 m$ and $\omega_m = b_m/2\omega_0 m$ can be derived from the natural frequency $\omega_0$ of the system given by $\omega_0 = \sqrt{k/m}$. The dimensionless quantities in the equations can be defined in terms of their dimensional counterparts as $x = \tilde{x}\omega_0^2/a_0$, $y = \tilde{y}\omega_0^2$, $t = \tilde{t}\omega_0$, and $\omega = \tilde{\omega}/\omega_0$, where $a_0$ is the input acceleration amplitude.

Given this model, the control electronics 112 is configured to select an appropriate value of the damping coefficient $b_e$ (and thus the corresponding electrical damping factor $\zeta_e$) in order to maximize the output power. For resonant harvesting where $\omega = 1$, this is accomplished by setting $b_e$ equal to $b_m$ (such that $\zeta_e = \zeta_m$). However, when the excitation source is not resonant (i.e., $\omega \neq 1$), this is no longer the case.

Figure 4:
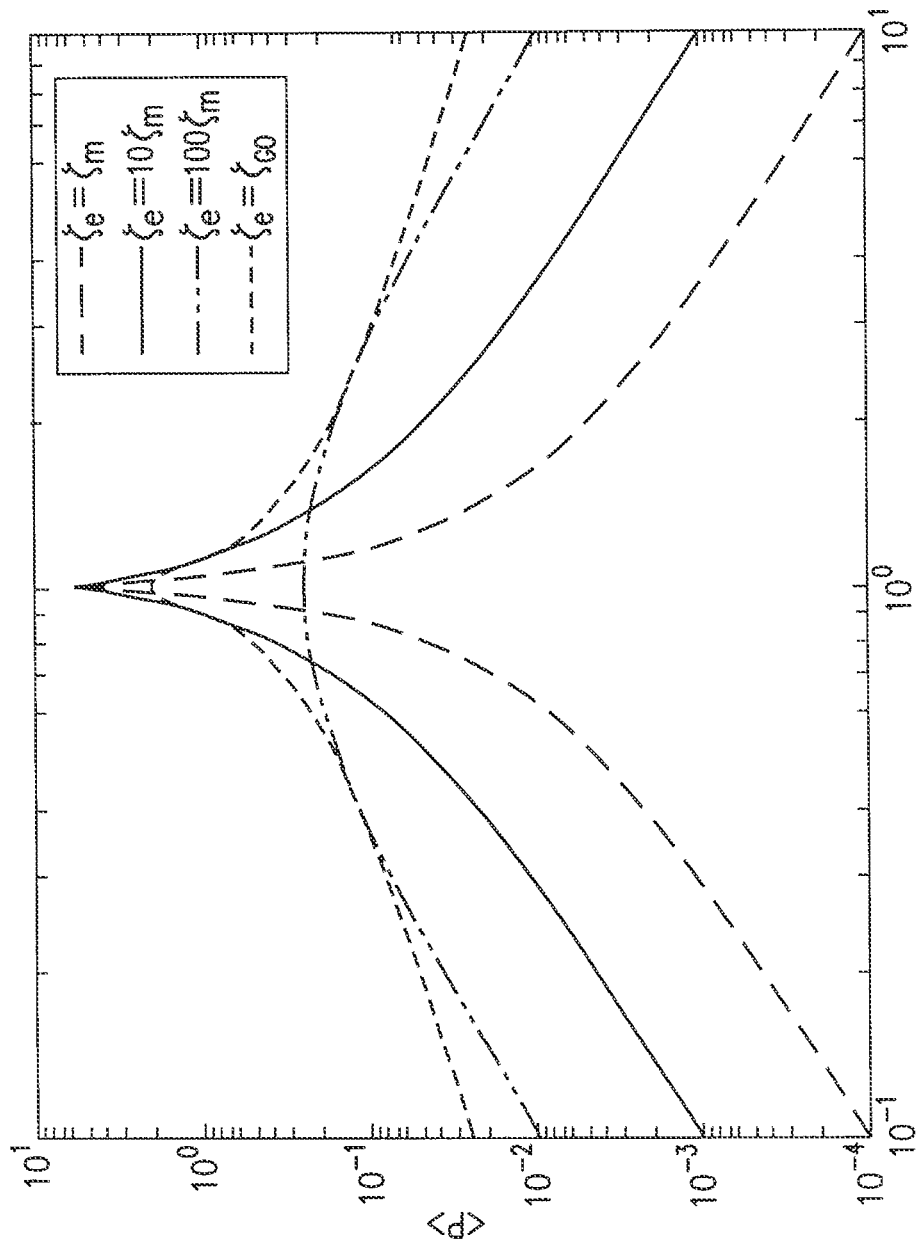
FIG. 4 is a graph of the simulation results showing the power harvested by the system of FIG. 1 as a function of excitation frequency, where the system employs a control scheme having a constant electrical damping factor; the different curves have different constant electrical damping factors as shown.

Power harvested in constant electrical damping systems as a function of excitation frequency is presented in FIG. 4 with $\zeta_m = 0.01$. The values in this plot are calculated using a time-difference numerical simulation in the time domain. The system is excited until the initial disturbances are damped out. A time-average of the electrically damped power, $P = 2\zeta_e\dot{y}^2$, is calculated over a period much longer than the natural and excitation period of the system. At resonance where $\omega = 1$, the power output to the electromagnetic transducer is maximized by setting $b_e$ equal to $b_m$ (such that $\zeta_e = \zeta_m$). The bandwidth of the system can be increased by increasing the electrical damping factor; however, this comes in the cost of decreasing peak (resonant) power. The power output from the generalized optimal damping factor $\zeta_{GO}$ is the most power that can be converted to electrical energy at a given input frequency.

FIG. 4 demonstrates the traditional trade-off made in constant electrical damping systems. The resonant power harvested is maximized when the electrical damping is matched with the mechanical damping; however, if the system is not properly tuned to the excitation frequency, the off-resonant power output drops off rapidly. The controller 112 can address this concern by increasing electrical damping and thus the bandwidth of the system; however, this also reduces the resonant peak. Therefore the trade-off that is often required in these systems is between the bandwidth and peek resonant power.

Another way to think about this is that, at an off-resonant input frequency, the optimal damping coefficient is higher than that at resonance. This optimal damping factor $\zeta_{GO}$ can be analytically calculated in the frequency domain based upon the complex relative speed of the harvester 102 as follows:

$$\dot{Y}(\omega) = \frac{i\omega^3}{(1-\omega^2) + 2i\omega(\zeta_e + \zeta_m)}. \quad (9)$$

Using the complex amplitude theorem (Eq. 2.15.14 of Melcher J R (1981) *Continuum Electromechanics*. MIT Press), the average power harvested can be given as:

$$\langle P \rangle = \tfrac{1}{2}(2\zeta_e)\dot{Y}(\omega)\dot{Y}^*(\omega), \quad (10)$$

where $\dot{Y}^*(\omega)$ is the complex conjugate of relative speed. As with other variables, the power is in dimensionless form and can be related to its dimensional form by $P = \tilde{P}\omega_0/ma_0^2$. The generalized optimal damping factor $\zeta_{GO}$ is determined by setting $d\langle P \rangle/d\zeta_e = 0$, and picking the positive root (as the negative root is not physically significant) as follows:

$$\zeta_{GO} = \left( \left( \frac{1-\omega^2}{2\omega} \right)^2 + \zeta_m^2 \right)^{1/2}. \quad (11)$$

The electrical damping factor $\zeta_e$ can then be set to the generalized optimal damping factor $\zeta_{GO}$. As illustrated in FIG. 4, the generalized optimal damping $\zeta_{GO}$ broadens the power peak without sacrificing the resonant performance. However, in order to implement this control strategy, partial state feedback is necessary to determine the excitation frequency $\omega$.

In an illustrate embodiment, the control electronics 112 is configured to vary the variable load resistance $R_L$ (control element) of the power electronics 104 in order to control the electrical damping factor $\zeta_e$ (or the corresponding electrical damping coefficient $b_e$) of the electromagnetic transducer in a manner that improves the off-resonant performance of the energy harvester 102. The control electronics 112 utilizes one or more sensors 114 that measure the base excitation x of the vibrating structure and the displacement y of the transducer relative to the vibrating structure and provide such measurements as inputs to the control electronics 112. The sensors 114 can also possibly measure the relative speed, $\dot{y}$, through the voltage output of the electromagnetic transducer.

For certain applications, the control electronics 112 can operate in a semi-active mode where the electrical damping is limited to positive values ($\zeta_e > 0$). In this semi-active mode, the electrical damping factor $\zeta_e$ can never be less than zero. As described above, the harvester 102 provides its peak power output at resonant frequency since the mechanical motion is best amplified at this critical frequency.

In one control scheme suitable for the semi-active mode, which is referred to herein as the simulated spring control scheme, the load resistances $R_L$ is modulated to change the electrical damping factor $\zeta_e$ (or the corresponding electrical damping coefficient $b_e$) such that the damping factor $\zeta_e$ satisfies the following parametric relations:

$$\zeta_e = \max\left[ \zeta_e^{min}, \zeta_e^{sim} + \frac{y}{2\dot{y}}(\omega^2 - 1) \right] \quad (12A)$$

for the case where $$\max\left[ \zeta_e^{min}, \zeta_e^{sim} + \frac{y}{2\dot{y}}(\omega^2 - 1) \right] < \zeta_e^{max};$$

or $$\zeta_e = \zeta_e^{max} \quad (12B)$$

for the case where $$\max\left[ \zeta_e^{min}, \zeta_e^{sim} + \frac{y}{2\dot{y}}(\omega^2 - 1) \right] \geq \zeta_e^{max}.$$

The parametric relation of Eqn. (12A) sets the electrical damping factor $\zeta_e$ to the maximum of two values for the case where such maximum is less than a predetermined upper bound $\zeta_e^{max}$. Otherwise, the electrical damping factor $\zeta_e$ is set to predetermined upper bound $\zeta_e^{max}$ as provided by the parametric relation of Eqn. (12B). The upper bound $\zeta_e^{max}$ may be dictated by the limitations of the electromagnetic transducer.

The first value of the parametric relation of Eqn. (12A) represents a predetermined lower bound $\zeta_e^{min}$. For example, $\zeta_e^{min}$ can be set to 0 to ensure that the mechanical system does not receive power from the electrical system. The second value of the parametric relation of Eqn. (12A) represents the output equivalent to the sum of the outputs of a mechanical damper with a constant damping coefficient $\zeta_e^{sim}$ and a spring with a predetermined spring constant. As adding a spring to the harvester 102 would shift the resonant frequency, this strategy seeks to take an off-resonant excitation frequency and add a spring to the system such that the system resonance matches this frequency. Note that the simulated spring term [i.e., $$\frac{y}{2\dot{y}}(\omega^2 - 1)]$$

of Eqn. (12A) can be negative, and thus the strategy is applicable to both subcritical and supercritical excitations. The simulated spring term [i.e., $$\frac{y}{2\dot{y}}(\omega^2 - 1)]$$

of the parametric relation of Eqn. (12A) is based on the displacement y, the relative speed $\dot{y}$ and the base excitation frequency $\omega$. The displacement y and the relative speed $\dot{y}$ are derived from the output of the sensor(s) 114. The base excitation frequency $\omega$ can be derived from analog or digital processing of a sensor signal. At steady-state all system states (e.g. position, current) oscillate with a frequency equivalent to the excitation frequency. Therefore, by processing the time history of a sensor output it is possible to determine the excitation frequency. A common algorithm utilized for determining the frequency content of a signal is the Fourier transform.

In the simulated spring control scheme, for critical excitations where $\omega = 1$, the electrical damping coefficient is constant and equal to the mechanical damping coefficient ($\zeta_e = \zeta_m$).

Figure 5B:
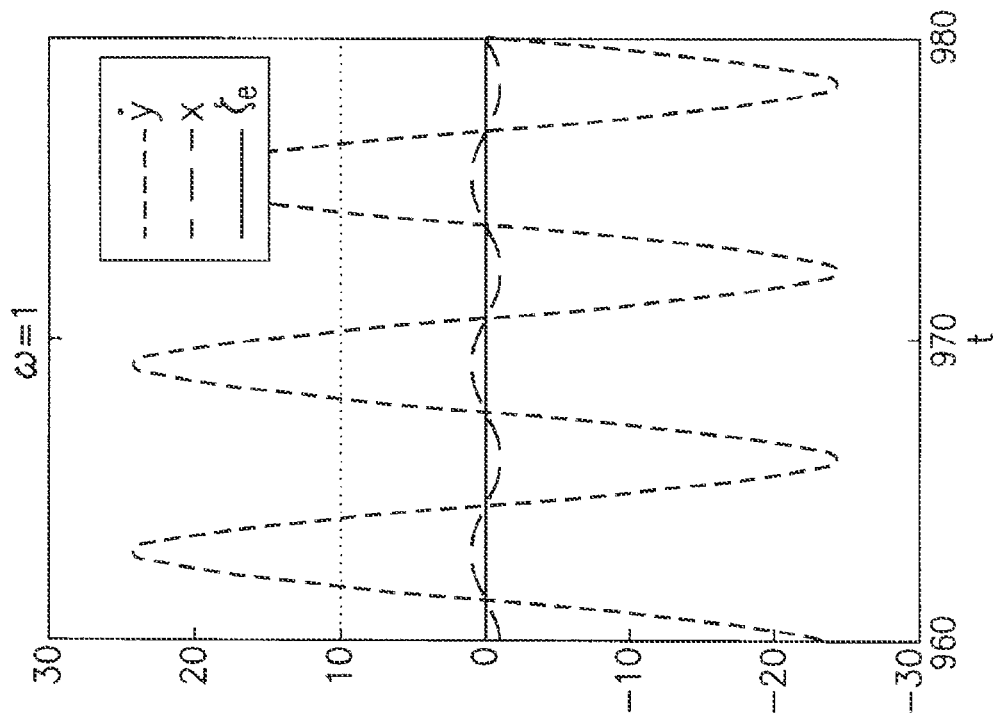
Figure 5A:
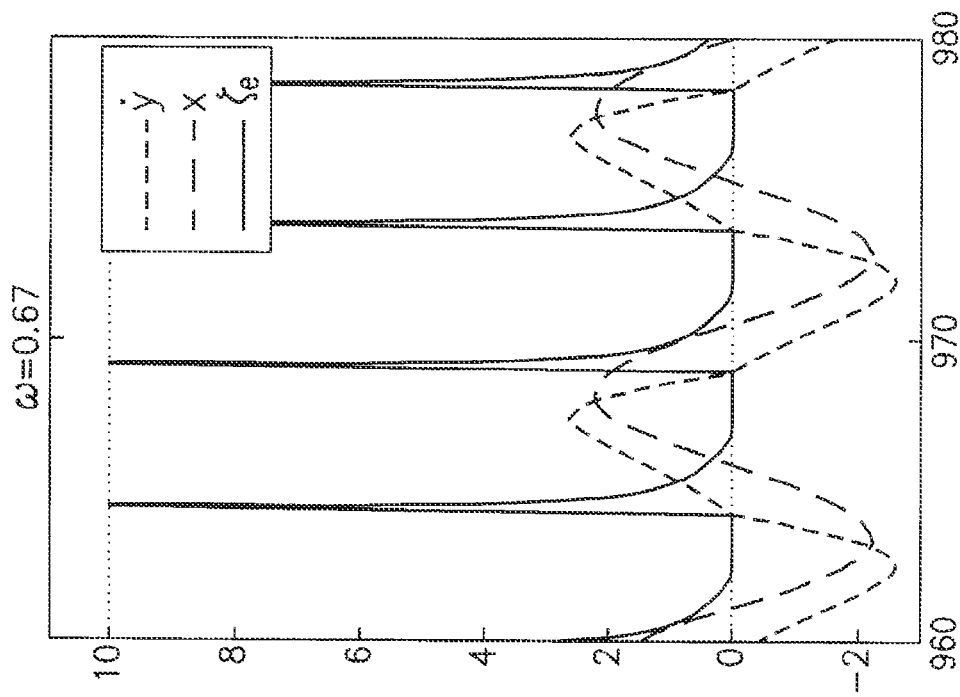

The behavior of the simulated spring control scheme is shown in time domain simulations results of FIGS. 5(A), 5(B) and 5(C). Note the simulated spring control scheme behaves identical to an optimally damped harvester in the resonant case where $\omega = 1$ as shown in 5(B). The electrical damping coefficient is constant and equal to the mechanical damping coefficient ($\zeta_e = \zeta_m$). For subcritical excitations where $\omega < 1$, the simulated spring control scheme results in a high damping factor while the relative speed $\dot{y}$ is leading excitation position x as shown in FIG. 5(A). For supercritical excitations where $\omega > 1$, the simulated spring control scheme generates a high damping factor at times when the relative speed is lagging. For both the subcritical and supercritical excitations (where $\omega \neq 1$), the system seeks to simulate the required positive or negative spring constant. The system achieves this when the signs of the displacement y and the relative speed $\dot{y}$ allow for a simulated spring load and when the transducer is capable of applying the load.

In the simulated spring control scheme, the damping of the electromagnetic transducer behaves similar to a spring and a fixed-rate damper whenever possible. This is particularly useful in maximizing the harvested power in the event that the background vibration is near-sinusoidal with a frequency not matching the resonant frequency. The added spring is adjusted to match what is required such that resonant frequency of the system matches the excitation frequency.

In another control scheme suitable for the semi-active mode, which is referred to herein as the simulated mass control scheme, the load resistance $R_L$ is modulated to change the electrical damping factor $\zeta_e$ (or the corresponding electrical damping coefficient $b_e$) such that the damping factor $\zeta_e$ satisfies the following parametric relations:

$$\zeta_e = \max\left[\zeta_e^{min}, \zeta_e^{sim} + \frac{\dot{y}}{2\ddot{y}}\left(\frac{1}{\omega^2} - 1\right)\right], \quad (13A)$$

for the case where $$\max\left[\zeta_e^{min}, \zeta_e^{sim} + \frac{\dot{y}}{2\ddot{y}}\left(\frac{1}{\omega^2} - 1\right)\right] < \zeta_e^{max};$$

or $$\zeta_e = \zeta_e^{max}, \quad (13B)$$

for the case where $$\max\left[\zeta_e^{min}, \zeta_e^{sim} + \frac{\dot{y}}{2\ddot{y}}\left(\frac{1}{\omega^2} - 1\right)\right] \geq \zeta_e^{max}.$$

The parametric relation of Eqn. (13A) sets the electrical damping factor $\zeta_e$ to the maximum of two values for the case where such maximum is less than a predetermined upper bound $\zeta_e^{max}$. Otherwise, the electrical damping factor $\zeta_e$ is set to predetermined upper bound $\zeta_e^{max}$ according to the parametric relation of Eqn. (13B). The upper bound $\zeta_e^{max}$ may be dictated by the limitations of the electromagnetic transducer.

The first value of the parametric relation of Eqn. (13A) represents a predetermined lower bound $\zeta_e^{min}$. For example, $\zeta_e^{min}$ can be set to 0 to ensure that the mechanical system does not receive power from the electrical system. The second value of the parametric relation of Eqn. (13A) seeks to simulate a system with a resonance matching the excitation frequency by modifying the mass of the transducer. The simulated mass term [i.e., $$\frac{\dot{y}}{2\ddot{y}}\left(\frac{1}{\omega^2} - 1\right)\right]$$

of the parametric relation of Eqn. (13A) is based on the relative speed $\dot{y}$, the relative acceleration $\ddot{y}$ and the base excitation frequency $\omega$. The relative speed $\dot{y}$ and the relative acceleration $\ddot{y}$ are derived from the output of the sensor(s) 114. The base excitation frequency $\omega$ can be derived from analog or digital processing of a sensor signal. At steady-state all system states (e.g. position, current) oscillate with a frequency equivalent to the excitation frequency. Therefore, by processing the time history of a sensor output it is possible to determine the excitation frequency. A common algorithm utilized for determining the frequency content of a signal is the Fourier transform.

In the simulated mass control scheme, for critical excitations where $\omega=1$, the electrical damping coefficient is constant and equal to the mechanical damping coefficient ($\zeta_e=\zeta_m$).

Figure 6C:
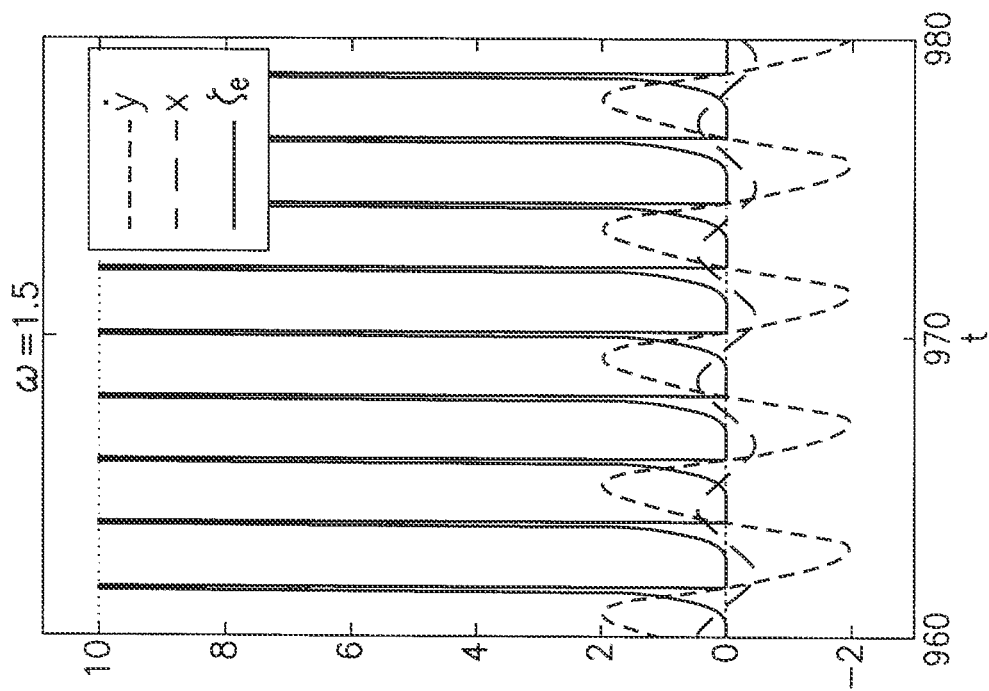
Figure 6B:
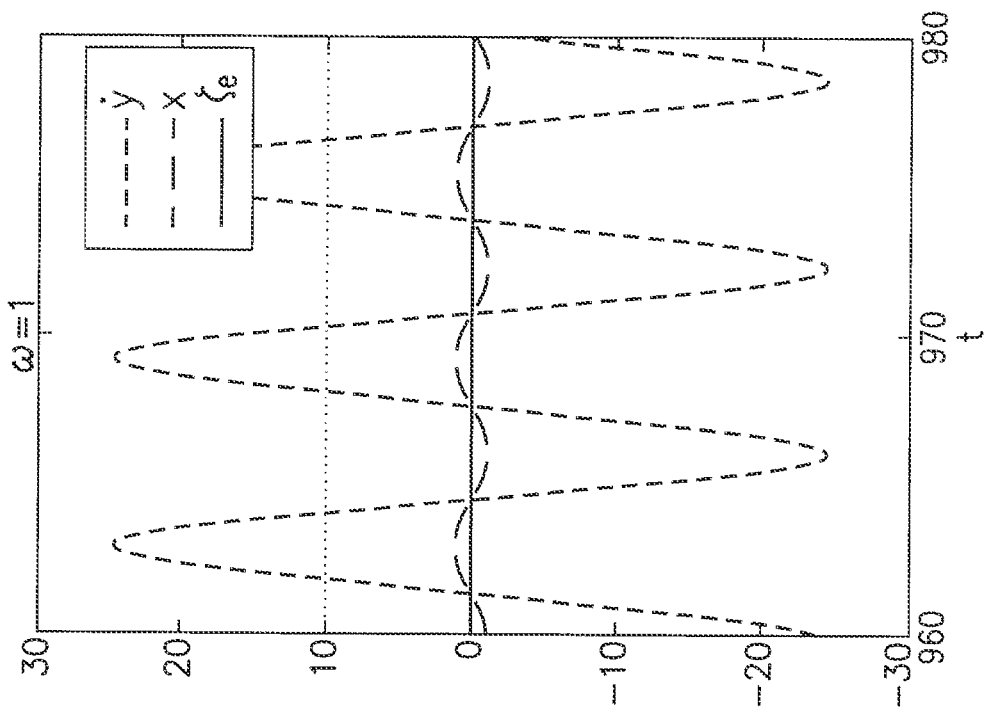

The behavior of the simulated mass control scheme is shown in time domain simulations results of FIGS. 6(A), 6(B) and 6(C). Note the simulated mass control scheme behaves identical to an optimally damped harvester in the resonant case where $\omega=1$ as shown in 6(B). The electrical damping coefficient is constant and equal to the mechanical damping coefficient ($\zeta_e=\zeta_m$). FIG. 6(A) shows the simulation results of the simulated mass control scheme for subcritical excitations where $\omega<1$. FIG. 6(C) shows the simulation results of the simulated mass control scheme for supercritical excitations where $\omega>1$. The simulation results are similar to the results of the simulated spring control scheme. One difference is the oscillating nature of the damping factor for subcritical excitations as shown in FIG. 6(A). This is mainly caused by the fact that the control system is generating a negative simulated mass which leads to instability in the control function.

In the simulated mass control scheme, for off-resonance excitation, the damping of the electromagnetic transducer is controlled by a simulated mass that is adjusted to match what is required such that resonant frequency of the system matches the off-resonant excitation frequency. This is particularly useful in maximizing the harvested power from the off-resonant vibrational energy.

In resonant vibrations the excitation acceleration $\ddot{x}$ and the relative velocity $\dot{y}$ are 180° out-of-phase. In yet another control scheme suitable for the semi-active mode, which is referred herein as the phase-matching control scheme, the load resistance $R_L$ is modulated to change the electrical damping factor $\zeta_e$ (and the corresponding electrical damping coefficient $b_e$) such that the excitation acceleration $\ddot{x}$ and the relative velocity $\dot{y}$ are brought into the 180° out-of-phase relationship for the cases in which they are not. This can be accomplished by the following parametric relations:

$$\zeta_e = \zeta_e^{max} \text{ for the case that } \ddot{x}\dot{y} \leq 0, \text{ or} \quad (14A)$$

$$\zeta_e = \zeta_e^{max} \text{ for the case that } \ddot{x}\dot{y} > 0. \quad (14B)$$

$\zeta_e^{max}$ represents a predetermined upper bound, which may be dictated by the limitations of the electromagnetic transducer. $\zeta_e^{min}$ represents a predetermined lower bound, which can be set to $\zeta_m$ in a typical case. The parametric relations of Eqns. (14A) and (14B) are based on the sign of the product of the excitation acceleration $\ddot{x}$ and the relative velocity $\dot{y}$, which provides a measure of relative phase offset between the excitation acceleration $\ddot{x}$ and the relative velocity $\dot{y}$. The excitation acceleration $\ddot{x}$ and the relative velocity $\dot{y}$ can be derived from the output of the sensor(s) 114. In an alternate embodiment, the control system can utilize the phase relationship between the excitation position x and relative velocity $\dot{y}$ since these variables are in-phase during resonant excitations. Any deviation from this phase relationship caused by an off-resonant excitation can be detected by a parametric relation similar to the one given in Eqns. (14A) and (14B).

Although the phase-matching control scheme appears to be a more indirect approach, it is important to note that this phase-matching control scheme does not require the determination of excitation frequency $\omega$, and thus may be implemented with less electronic complexity. It is also possible to generate similar control actions utilizing resonant phase relationships between other variables (such as displacement variables, velocity variables, acceleration variables, current variables and voltage variables of the transducer as well as current variables and voltage variables of the variable load circuitry of the power electronics 104) as measured by the output of the sensor(s) 114 of the system.

Figure 7C:
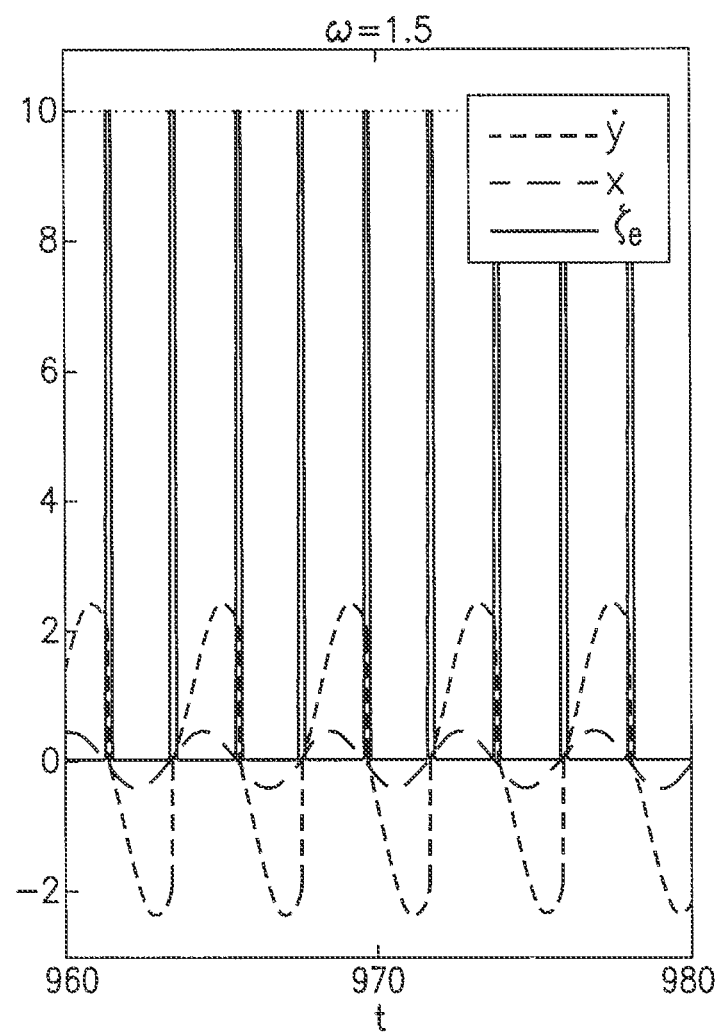

The behavior of the phase-matching control scheme is shown in time domain simulations results of FIGS. 7(A), 7(B) and 7(C). Note the phase-matching control scheme behaves identical to an optimally damped harvester in the resonant case where $\omega=1$ as shown in 7(B). FIG. 7(A) shows the simulation results of the phase-matching control scheme for subcritical excitations where $\omega<1$. FIG. 7(C) shows the simulation results of the phase-matching control scheme for supercritical excitations where $\omega>1$. The simulation results are similar to the results of the simulated spring control scheme.

Alternate phase-matching control schemes can employ another variable pair that has a phase relationship of in-phase or 180 degrees out of phase in resonant vibrations. In such configuration, the load resistance $R_L$ can be modulated to change the electrical damping factor $\zeta_e$ (and the corresponding electrical damping coefficient $b_e$) to bring the variable pair into a target phase relationship of in-phase or 180 degrees out of phase for cases, respectively, when the phase relationship of the variable pair varies from the target phase relationship.

Figure 8:
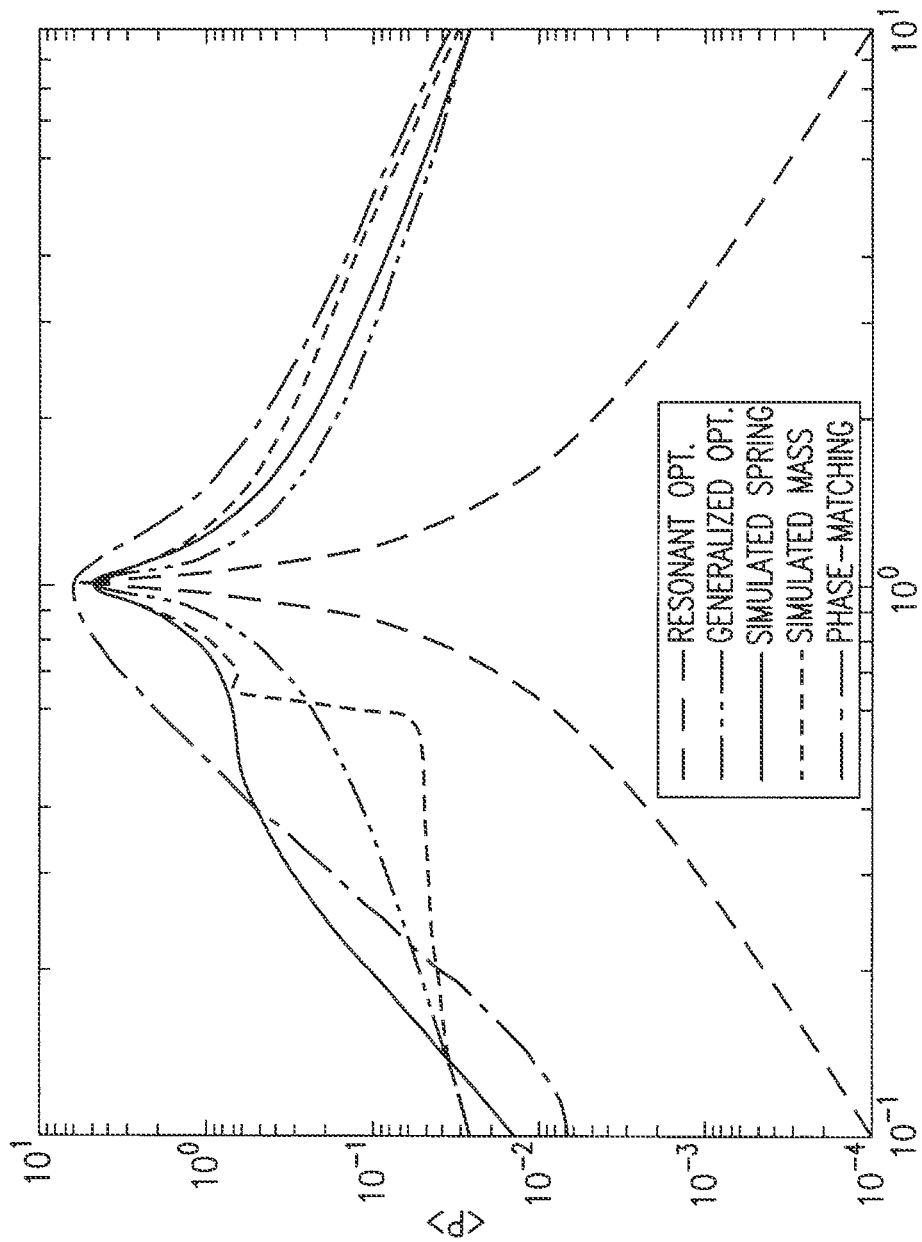
FIG. 8 is a graph of the simulation results showing the power harvested by the system of FIG. 1 as a function of excitation frequency, where the system employs a number of different semi-active control schemes as described in the present application; the different curves correspond to different control schemes as shown.

FIG. 8 shows the average power harvested by the control schemes described above for comparison of the power generation capabilities of these schemes. FIG. 8 also shows the power generated with the generalized optimal damping factor of Eqn. (8). Since the generalized optimal damping factor provides the maximum average power output that is possible at a given excitation frequency with a constant damping factor, it serves as a good baseline comparison to the other control strategies. The plots show the average power harvested under harmonic loading conditions. In order to provide a direct comparison, the electronic damping factor is bounded to $\zeta_e^{max}=10$ for all of the generated plots. The lower bound $\zeta_e^{min}$ is set to zero for all of the control schemes except for the phase-matching control, for which $\zeta_e^{min}=\zeta_m=0.01$. The generalized optimal electrical damping provides a larger bandwidth than a system optimized only for the resonant peak. All of the other control schemes utilizing the time-varying damping factor provide a broader peak without sacrificing resonant performance, with phase-matching approach providing the best overall response characteristics.

Figure 9:
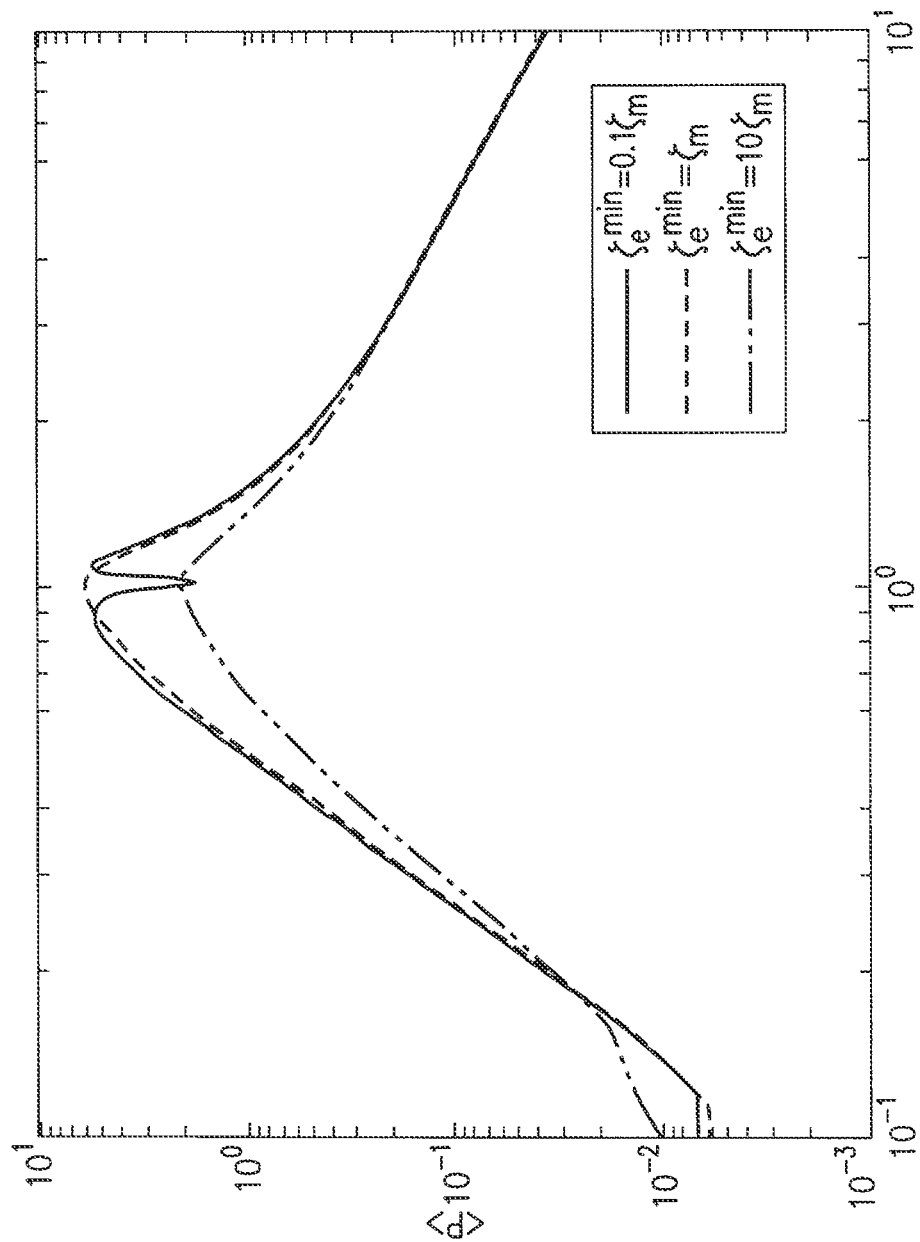
FIG. 9 is a graph of the simulation results showing the power harvested by the system of FIG. 1 as a function of excitation frequency, where the system employs a phase-matching control scheme as described in the present application; the different curves correspond to different values for a parameter of the phase-matching control scheme.

In the simulated mass and spring control schemes, the lower bound $\zeta_e^{min}$ of the electrical damping factor is not an important parameter as long as it can be set to be as low as the mechanical damping factor. However, in the phase-matching control scheme, the lower bound $\zeta_e^{min}$ of the electrical damping factor can affect the harvesting performance as demonstrated in FIG. 9. The system performance can be improved slightly for off-resonant excitations with smaller damping factors; however, this results in a penalty in power harvested near resonance. In one embodiment, the parameter $\zeta_e^{min}$ can be set to $\zeta_m$ in order to give overall performance as evident from FIG. 9.

An additional advantage of the phase-matching control scheme is that it allows the system to seek resonant operation quicker under a time-varying harmonic excitation. In order to demonstrate this, the system was simulated with a phase-modulated input signal as follow:

$$\ddot{x}=\sin(\omega t+\pi \sin(\omega_p t)), \quad (15)$$

where $\omega_p$ is the modulation frequency of the base excitation.

Figure 10:
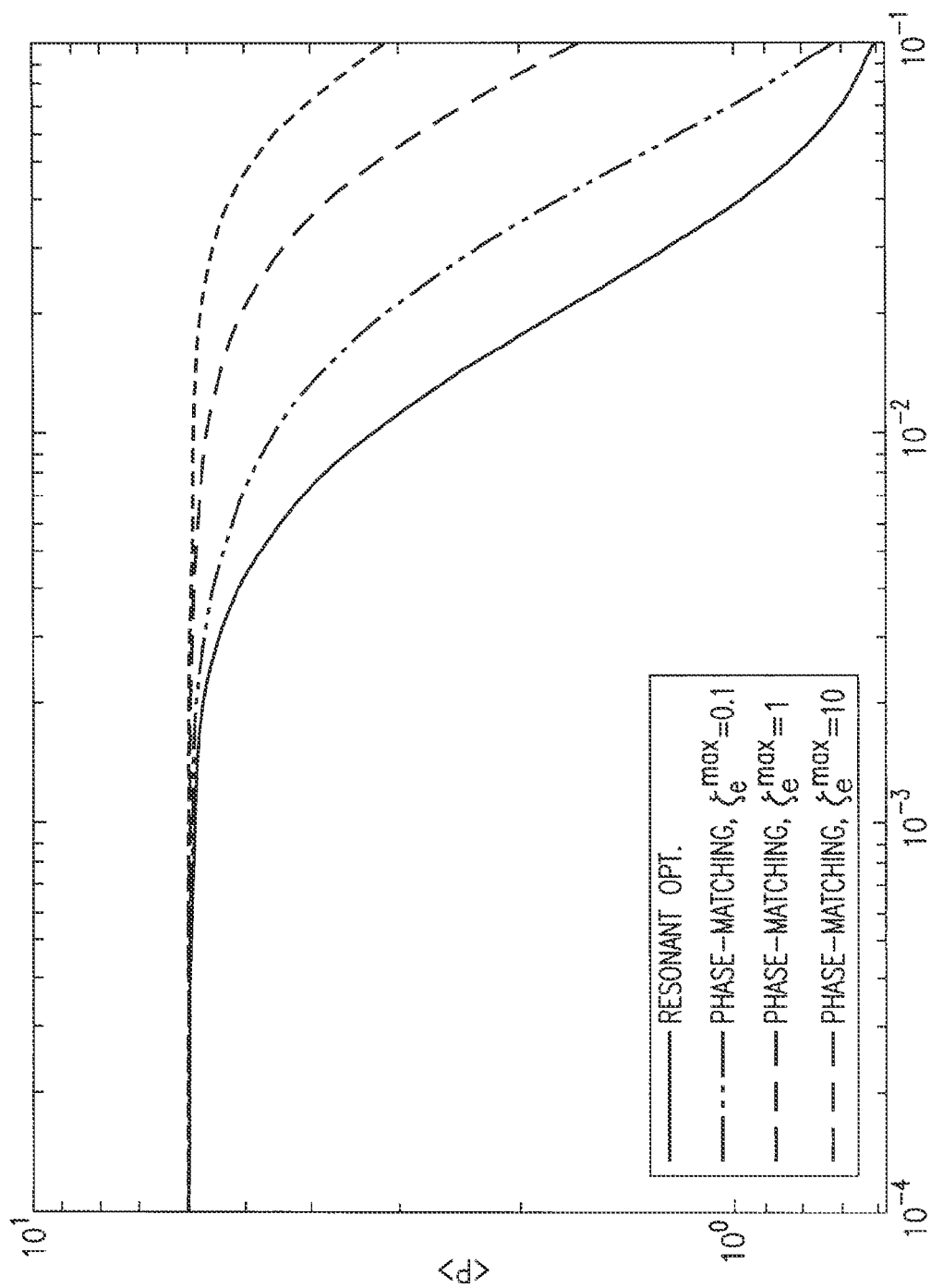
FIG. 10 is a graph of the simulation results showing the power harvested by the system of FIG. 1 as a function of modulated excitation frequency, where the system employs a phase-matching control scheme as described in the present application; the different curves correspond to different values for a parameter of the phase-matching control scheme as well as a curve (labeled "Resonant Opt.") corresponding to control scheme having a constant electrical damping factor.

The power output of three phase-matching control schemes of varying $\zeta_e^{min}$ for $\zeta_m=0.01$ under resonant excitations ($\omega=1$) of varying modulation frequency $\omega_p$ is plotted in FIG. 10. The power output for the optimal constant damping factor is also plotted. All of the systems result in the same power output for low levels of the modulation frequency $\omega_p$ since under this small perturbation from a resonant excitation, the system response gets minimally affected. However, as $\omega_p$ increases, the phase-matching control output becomes higher as this system allows for the inertial mass to seek the resonant output quicker.

Figure 11:
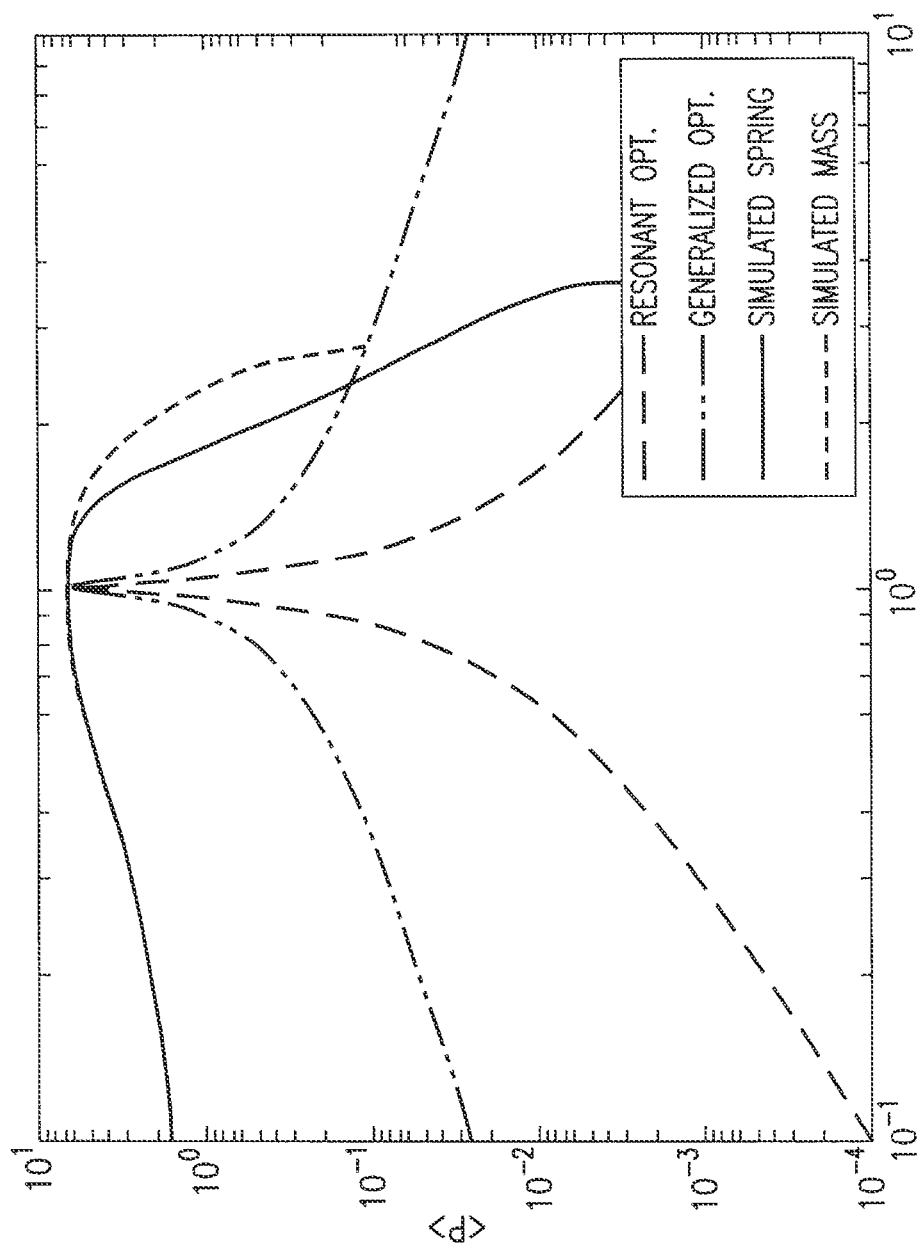
FIG. 11 is a graph of the simulation results showing the power harvested by the system of FIG. 1 as a function of excitation frequency, where the system employs a number of different bipolar control schemes as described in the present application; the different curves correspond to different control schemes as shown.

For other applications, the control electronics 112 can operate in a bipolar mode where the electrical damping can have negative values. This bipolar mode allows the system to convert electrical energy back into the mechanical domain to enhance harvesting and thus requires capacitive or inductive energy stored on the electronics. For this bipolar mode, the simulated spring control scheme, the simulated mass control scheme and the phase-matching control scheme as described above can be adapted by allowing the lower bound $\zeta_e^{min}$ of the electrical damping factor to be set to negative values. FIG. 11 is a plot of exemplary simulation results from these control schemes where the lower bound $\zeta_e^{min}$ of the electrical damping factor is set to −10. The average power output of the mechanical system is shown over an interval much longer than the excitation frequency (20 cycles), thus the parameter observed <P> is net harvested energy in FIG. 11. Note that the simulated spring control scheme appears to be more effective than the simulated mass control for subcritical excitations. For supercritical excitations, the opposite is the case. Compared with results obtained with $\zeta_e^{min}=0$, the peak is broader and thus allows for a more robust harvester to be implemented. Simulated mass control shows more drawbacks for excitations far from resonant frequency.

Advantageously, the various control schemes for the electromagnetic energy harvesting system as described herein show potential in maximizing power output. Specifically, the control schemes enhance the off-resonant peak power, effectively increasing the harvester bandwidth without reducing resonant performance. Such benefits can reduce the constraints for system tuning or in effect realize a more robust harvester system.

It is also contemplated that other circuit models of the harvester 102 and power electronics 104 can be used. In this case, one or more different control elements can be controlled by the control electronics 112 in order to control the damping rate of the coil(s) of the electromagnetic transducer of the harvester 102 for broadband response.

It is also contemplated that the various control schemes as described herein can be applied to vibrational energy harvesters that utilize a piezoelectric transducer. Although the piezoelectric materials provide a non-analogous electromagnetic transduction mechanism to the electromagnetic transducers described above, their force profiles are governed by the electrical load that is placed on them, and hence the harvesting electronics can be utilized to implement the various control schemes as described herein. For example, the phase-matching control system may be implemented to vary the resistance of a shunt resistor $R_s$ connected across the piezoelectric element as follows:

$$R_s=R_1 \text{ for the case that } \dot{x}\dot{y} \leq 0, \text{ or} \quad (16A)$$

$$R_s=R_2 \text{ for the case that } \dot{x}\dot{y} > 0. \quad (16B)$$

where $R_1$ and $R_2$ are different shunt resistance levels.

The off-resonant response of the energy harvester system as described herein is particularly important in their performance under broadband vibrations. The ability of the energy harvesting system to either adapt to an non-resonant input (tuning) or have a broad frequency response to accept a range of inputs allow for improved efficiency in cases where a non-harmonic background vibrations are present. Utilizing adaptable electronics to improve harvesting efficiency has advantages as there is no added complexity to the mechanical system.

As discussed earlier, a certain amount of electronics are commonly utilized with vibrational energy harvesters to provide a desired load on the system to increase the output power. These electronics also often utilize feedback control schemes that operate at switching frequencies far exceeding the harvester mechanical resonance. It is thus possible to implement a wide range of control schemes without adding complexity to existing systems.

The technological advances of the embodiments described above can be utilized in subsurface tools for oil & gas exploration and production as these embodiments can aid the designers of such subsurface tools to implement simple methods of collocating devices and power sources that derive electrical energy from harvesting of environmental vibrational energy.

Figure 12:
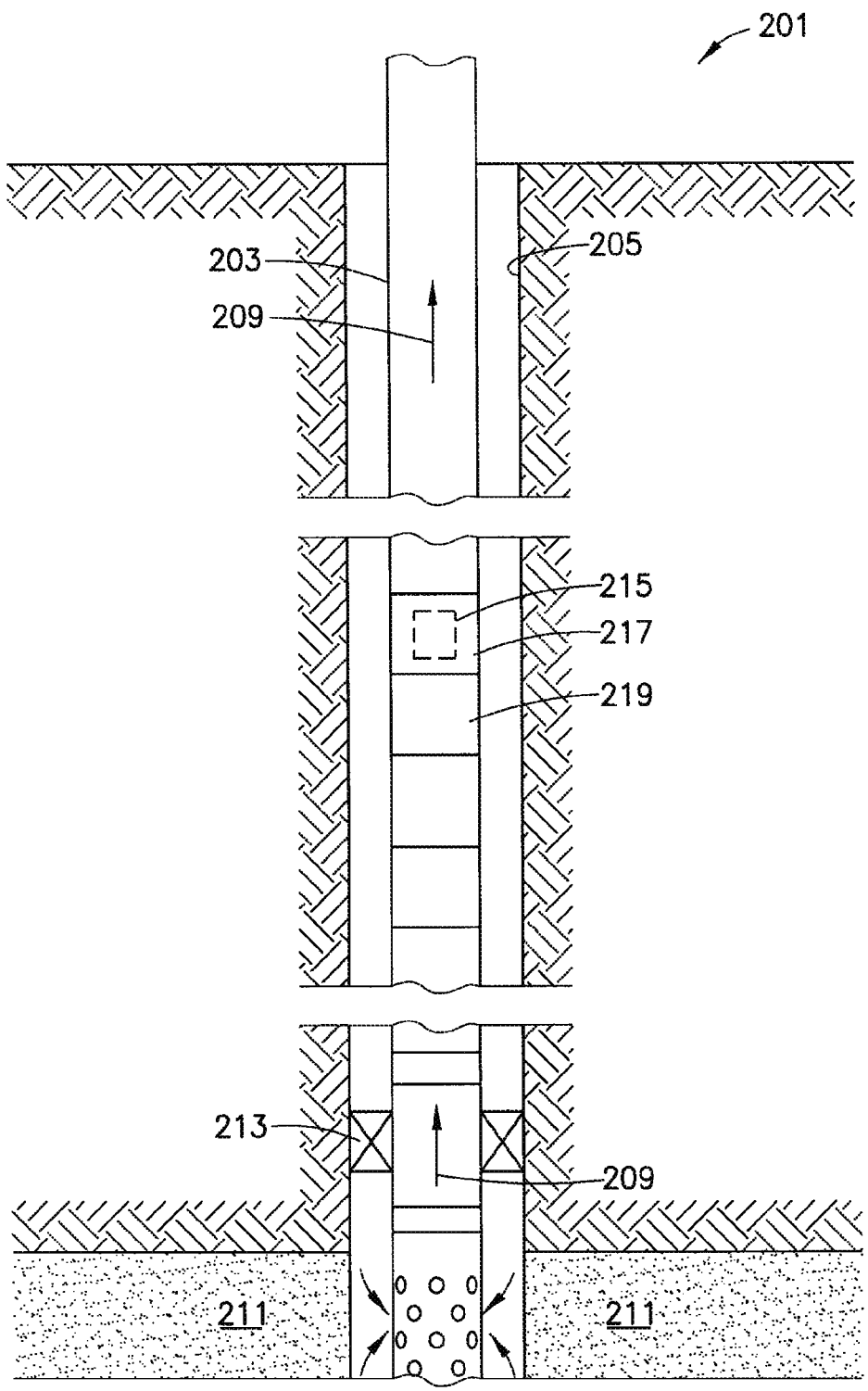
FIG. 12 is a schematic diagram of a hydrocarbon producing well according to an embodiment of the present application.

FIG. 12 shows an embodiment of a subsurface tool 201 that includes a tubular string 203 (a production string, for example) that extends into a wellbore 205. The tubular string 203 may include a central passageway that communicates a flow 209 from a subterranean formation zone 211 (or to a formation zone in the case of an injection well). The zone 211 represents one out of many possible zones traversed by the wellbore 205. The zone 211 may be defined (i.e., isolated from other zones) by one or more packers 213 (one being depicted in FIG. 12).

The flow 209 is a primary source of vibrational energy downhole, and this vibrational energy can be captured by a vibrational energy harvesting system 215 housed in a power generation tool body 217 for purposes of converting the vibrational energy into downhole electrical power. This electrical power, in turn, may be used to power one or more downhole power-consuming components, such as sleeve valves, ball valves, motors, actuators, sensors, sound sources, electromagnetic signaling sources, or equipment to fire "smart bullets" into a well casing, perforating gun firing heads, controllers, microprocessors, Micro Electrical Mechanical Sensors (MEMS), telemetry systems (transmitters or receivers), etc., depending on the particular application. The vibrational harvesting system 215 of the power generation tool body 217 can be based on the embodiments described above.

The tubular string 203 can include one or more vibration enhancement mechanisms (one shown as 219) that enhance the generation of vibrational energy for capture by the vibrational energy harvesting system 215. For example, the flow 209 can enter the vibration enhancement mechanism 219, which operates to produce a locally more turbulent flow that flows uphole. The creation of this more turbulent flow, in turn, amplifies the vibrational energy, thereby leading to the increased production of downhole power. The vibrational harvesting system 215 can be located in proximity to (within ten feet, for example) to the vibration enhancing mechanism 219.

The vibration enhancing mechanism 219 can include a structural member (such as a flow path obstructer or diverter or Venturi-type orifice or flexible moving member) that is configured to create turbulence in the flow 209 in order to generate environmental vibrations downhole in response to the flow 209. The vibration enhancing mechanism 219 can also be realized by varying the wall thickness of a portion of the tubular string 203 in order to enhance the fundamental vibration mode of the tubular string portion. Other suitable vibration enhancing mechanisms can also be used.

In other embodiments, vibrational energy harvesting systems as described herein can be integrated as part of the subsurface production tool to harvest vibrational energy generated by artificial lift devices (such as gas lift valves and electrical submersible pumps). In yet other embodiments, the vibrational energy harvesting systems as described herein can be integrated as part of the surface-located production tools as well as subsea-located tree structures that monitor and control the operation of subsea wells in order to harvest vibration from the flow of produced fluid.

Figure 13:
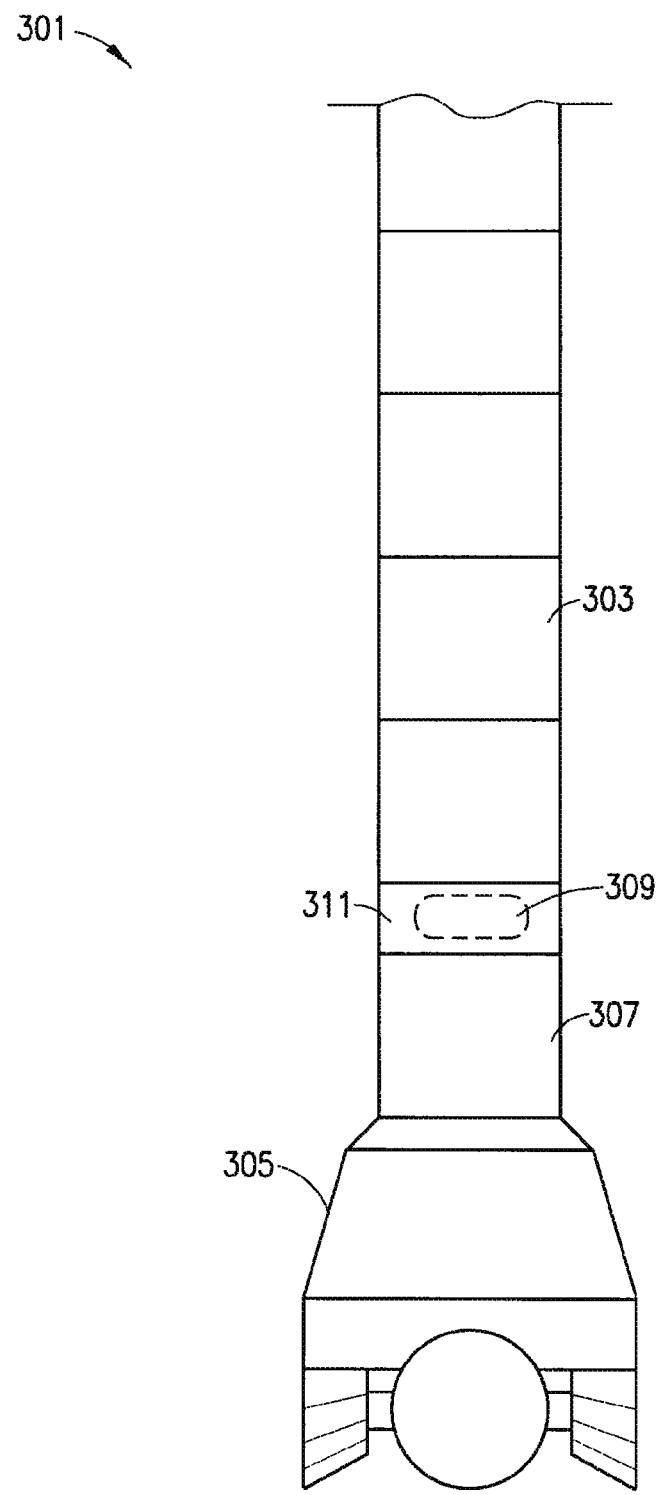
FIG. 13 is a schematic diagram of a subsurface drilling string according to an embodiment of the present application.

FIG. 13 depicts a drill string 301 that includes a mud motor 303 and a drill bit 305. The drill string 301 may include a tool body 307 with sensors that are used for purposes of monitoring operation of the drill string 301 and monitoring general operation of the drilling. The sensors are located close to the drill bit 305. A particular challenge with this arrangement is that the sensor tool body 307 may be located away from a power source and thus, electrical cables may have to span across the mud motor 303 for purposes of delivering power to the sensors of the tool body 307. However, in an embodiment of the present application, the sensor tool body 307 may be in close proximity to a vibrational energy harvesting system 309 housed in a power generation tool body 311 for purposes of converting downhole vibrational energy of the drill string 301 (which occurs during operation of the mud motor 303 and interaction between the drill bit 305 and the formation rock). This electrical power, in turn, may be used to power one or more downhole power-consuming components, such as the sensors, telemetry system (transmitter and receiver) and/or other electrical components of the sensor tool body 307. The vibrational harvesting system 309 of the power generation tool body 311 can be based on the embodiments described above. Due to this arrangement, cabling does not have to be extended across the mud motor 303 for purposes of delivering power to the electrical components of the sensor tool body 307. Furthermore, due to the generation of electrical power downhole, various control lines and electrical cables do not need to be extended from the surface of the well.

There have been described and illustrated herein several embodiments of a system that converts environmental vibrational energy into electrical energy for storage in at least one electrical power storage device and control schemes and methodologies employed therein. While particular embodiments of the invention have been described, it is not intended that the invention be limited thereto, as it is intended that the invention be as broad in scope as the art will allow and that the specification be read likewise. Thus, while particular mechanical models and electrical models have been disclosed for a vibrational energy harvester, it will be appreciated that other mechanical models and electrical models can be used as well. In addition, while particular variables and constraints have been disclosed for the control schemes described herein, it will be understood that the control schemes can be adapted to utilize different variables and constraints. Moreover, while particular system configurations have been disclosed, it will be appreciated that other system configurations could be used as well. It will therefore be appreciated by those skilled in the art that yet other modifications could be made to the provided invention without deviating from its spirit and scope as claimed.

What is claimed is:

1. A system for converting environmental vibrational energy into electrical energy for storage in at least one electrical power storage device, the system comprising:

a transducer that undergoes oscillating movement in response to the environmental vibrational energy, the transducer producing an oscillating electrical signal in response to the oscillating movement;

power electronics, operably coupled between the transducer and the at least one electrical power storage device, the power electronics processing the oscillating electrical signal produced by the transducer, wherein the power electronics includes at least one control element having a configuration that provides variable dampening of the oscillating movement of the transducer in response to at least one control signal supplied thereto;

at least one sensor for measuring properties of the oscillations of the transducer over time; and control electronics operably coupled to the at least one control element of the power electronics and to the at least one sensor, the control electronics carrying out a control scheme that generates and supplies the at least one control signal to the at least one control element over time in a manner that controls the at least one control element to dynamically vary the dampening of the oscillating movement of the transducer over time, wherein the control scheme is based upon a predetermined parametric relation involving a plurality of variables derived from the properties measured by the at least one sensor, wherein the plurality of variables include a first variable representing excitation frequency of the transducer.

2. A system according to claim 1, wherein:
the plurality of variables further includes a second variable representing relative position of the transducer.

3. A system according to claim 1, wherein:
the plurality of variables further includes a third variable representing relative velocity of the transducer.

4. A system according to claim 1, wherein:
the plurality of variables further includes a fourth variable representing relative acceleration of the transducer.

5. A system according to claim 1, wherein:
the plurality of variables further includes a fifth variable representing electrical current of the transducer.

6. A system according to claim 1, wherein:
the plurality of variables further includes a sixth variable representing electrical voltage of the transducer.

7. A system according to claim 1, wherein:
the predetermined parametric relation includes a term representing a damping factor for controlling the damping of the oscillating movement of the transducer, which results in the transducer force to be equivalent to the sum of a spring with a predetermined spring constant and a mechanical damper with a constant damping coefficient.

8. A system according to claim 7, wherein:
the predetermined spring constant is configured such that the theoretical system resonance under the influence of a mechanical spring of the predetermined spring constant matches a particular off-resonant excitation frequency.

9. A system according to claim 7, wherein:
the part of the term representing a spring with a predetermined spring constant is based on the plurality of variables, which include the first variable representing excitation frequency of the transducer, a second variable representing relative position of the transducer, and a third variable representing relative velocity of the transducer.

10. A system according to claim 7, wherein:
the damping factor term is constrained by a lower bound, the lower bound greater than or equal to zero such that the damping factor term is always positive.

11. A system according to claim 8, wherein:
the damping factor term is constrained by a lower bound, the lower bound less than zero such that the damping factor term can be both negative and positive.

12. A system according to claim 1, wherein:
the predetermined parametric relation includes a term representing a damping factor for controlling the damping of the oscillating movement of the transducer, which results in the transducer force to be equivalent to the sum of a mechanical damper with a constant damping coefficient and a simulated mass.

13. A system according to claim 12, wherein:
the simulated mass is configured such that the theoretical system resonance under the influence of an equivalent physical mass matches a particular off-resonant excitation frequency.

14. A system according to claim 12, wherein:
the part of the term representing the simulated mass is based on the plurality of variables, which include the first variable representing excitation frequency of the transducer, a second variable representing relative velocity of the transducer, and a third variable representing relative acceleration of the transducer.

15. A system according to claim 12, wherein:
the damping factor term is constrained by a lower bound, the lower bound greater than or equal to zero such that the damping factor term is always positive.

16. A system according to claim 12, wherein:
the damping factor term is constrained by a lower bound, the lower bound less than zero such that the damping factor term can be both negative and positive.

17. A system according to claim 1, wherein:
the parametric relation of the control scheme is configured to extend the bandwidth of oscillatory movements of the transducer that produce oscillating electrical signals by the transducer.

18. A system according to claim 1, wherein:
the transducer comprises at least one coil and magnet that move relative to one another, wherein the at least one coil produces the oscillating electrical signal.

19. A system according to claim 18, wherein:
the at least one control element of the power electronics comprises variable load circuitry operably coupled to the output of the at least one coil.

20. A system according to claim 1, wherein:
the transducer comprises at least one piezoelectric element that produces the oscillating electrical signal.

21. A system according to claim 20, wherein:
the at least one control element of the power electronics comprises variable load circuitry operably coupled to the output of the at least one piezoelectric element.

22. A system according to claim 1, wherein:
the transducer and power electronics are configured to convert environmental vibrational energy into electrical energy, wherein the environmental vibrational energy is caused by fluid flow through a subterranean well or by drilling operations in a subterranean well.

23. A system for converting environmental vibrational energy into electrical energy for storage in at least one electrical power storage device, the system comprising:
a transducer that undergoes oscillating movement in response to the environmental vibrational energy, the transducer producing an oscillating electrical signal in response to the oscillating movement of the transducer;
power electronics, operably coupled between the transducer and the at least one electrical power storage device, the power electronics processing the oscillating electrical signal produced by the transducer, wherein the power electronics includes at least one control element having a configuration that provides variable dampening of the oscillating movement of the transducer in response to at least one control signal supplied thereto;
at least one sensor for measuring properties of the oscillations of the transducer over time; and
control electronics operably coupled to the at least one control element of the power electronics and to the at least one sensor, the control electronics carrying out a control scheme that generates and supplies the at least one control signal to the at least one control element over time in a manner that controls the at least one control element to dynamically vary the dampening of oscillations of the transducer over time, wherein the control scheme is based upon a predetermined parametric relation representing relative phase between two variables derived from the properties measured by the at least one sensor.

24. A system according to claim 23, wherein:
the two variables have a phase relationship of in-phase or 180 degrees out of phase in resonant vibrations, and the control scheme is configured to bring the two variables into a target phase relationship of in-phase or 180 degrees out of phase for cases, respectively, when the phase relationship of the two variables varies from the target phase relationship.

25. A system according to claim 23, wherein:
at least one of the variables represents a time-varying characteristic of the transducer selected from the group consisting of:
i) excitation acceleration,
ii) excitation velocity,
iii) excitation position,
iv) relative acceleration,
v) relative velocity,
vi) relative position,
vii) electrical current, and
viii) electrical voltage.

26. A system according to claim 23, wherein:
the control scheme includes first and second terms each representing constant damping factors for controlling the damping of oscillations of the transducer, wherein the first term represents a constant damping factor less than the constant damping factor represented by the second term.

27. A system according to claim 26, wherein:
the control scheme selects the constant damping factor of one of the first and second terms based upon a measure of the phase relationship of the two variables.

28. A system according to claim 27, wherein:
the measure of the phase relationship of the two variables is derived by multiplying the two variables.

29. A system according to claim 23, wherein:
the parametric relation of the control scheme is configured to extend the bandwidth of oscillations of the transducer that produce oscillating electrical signals by the transducer.

30. A system according to claim 23, wherein:
the transducer comprises at least one coil and magnet that move relative to one another, wherein the at least one coil produces the oscillating electrical signal.

31. A system according to claim 30, wherein:
the at least one control element of the power electronics comprises variable load circuitry operably coupled to the output of the at least one coil.

32. A system according to claim 23, wherein:
the transducer comprises at least one piezoelectric element that produces the oscillating electrical signal.

33. A system according to claim 32, wherein:
the at least one control element of the power electronics comprises variable load circuitry operably coupled to the output of the at least one piezoelectric element.

34. A system according to claim 21, wherein:
the transducer and power electronics are configured to convert environmental vibrational energy into electrical energy, wherein the environmental vibrational energy is caused by fluid flow through a subterranean well or by drilling operations in a subterranean well.

* * * * *